(12) United States Patent
Kinoshita et al.

(10) Patent No.: US 11,580,156 B2
(45) Date of Patent: Feb. 14, 2023

(54) WORKPIECE IMAGE SEARCH APPARATUS AND WORKPIECE IMAGE SEARCH METHOD

(71) Applicant: Mitsubishi Electric Corporation, Tokyo (JP)

(72) Inventors: Hiroyuki Kinoshita, Tokyo (JP); Ryosuke Kawanishi, Tokyo (JP); Toshiyuki Morita, Aichi (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/762,094

(22) PCT Filed: Nov. 28, 2019

(86) PCT No.: PCT/JP2019/046610
§ 371 (c)(1),
(2) Date: Mar. 21, 2022

(87) PCT Pub. No.: WO2021/106154
PCT Pub. Date: Jun. 3, 2021

(65) Prior Publication Data
US 2022/0350835 A1 Nov. 3, 2022

(51) Int. Cl.
*G06F 16/532* (2019.01)
*G06V 10/75* (2022.01)
(Continued)

(52) U.S. Cl.
CPC ........ *G06F 16/532* (2019.01); *G06F 16/5854* (2019.01); *G06T 15/20* (2013.01);
(Continued)

(58) Field of Classification Search
CPC . G06F 16/532; G06F 16/5854; G06V 10/754; G06V 10/761; G06V 10/46; G06V 10/26; G06V 2201/06; G06T 15/20
(Continued)

(56) References Cited

U.S. PATENT DOCUMENTS 4,843,631 A * 6/1989 Steinpichler ........... G06V 10/42
382/280
6,490,498 B1 12/2002 Takagi
(Continued)

FOREIGN PATENT DOCUMENTS

| CN | 1614593 A | 5/2005 |
| CN | 1769838 A | 5/2006 |

(Continued)

OTHER PUBLICATIONS

Bustos, Benjamin, et al., "Feature-Based Similarity in 3D Object Databases", ACM Computing Surveys, vol. 37, No. 4, Dec. 2005, pp. 345-387.*

(Continued)

*Primary Examiner* — Robert Stevens
(74) *Attorney, Agent, or Firm* — Xsensus LLP

(57) ABSTRACT

A workpiece image search apparatus includes: a workpiece image deformation unit that generates a third workpiece image by deforming a second workpiece image so that a difference in workpiece shape between a first workpiece image and the second workpiece image becomes smaller, wherein the first workpiece image is obtained by projecting a first workpiece shape of a first workpiece on a two-dimensional plane, and the second workpiece image is obtained by projecting a second workpiece shape of a second workpiece on a two-dimensional plane; and a similarity calculation unit that calculates a similarity between the first workpiece shape and the second workpiece shape by (Continued)

comparing the third workpiece image with the first workpiece image.

13 Claims, 14 Drawing Sheets

(51) Int. Cl.
    *G06V 10/74*     (2022.01)
    *G06V 10/46*     (2022.01)
    *G06T 15/20*     (2011.01)
    *G06F 16/583*    (2019.01)
    *G06V 10/26*     (2022.01)

(52) U.S. Cl.
    CPC .............. *G06V 10/26* (2022.01); *G06V 10/46* (2022.01); *G06V 10/754* (2022.01); *G06V 10/761* (2022.01); *G06V 2201/06* (2022.01)

(58) Field of Classification Search
    USPC .......................................................... 707/769
    See application file for complete search history.

(56) References Cited

U.S. PATENT DOCUMENTS

| | | | |
|---|---|---|---|
| 10,324,452 | B2 | 6/2019 | Yamamoto et al. |
| 2004/0190775 | A1 | 9/2004 | Miller |
| 2004/0249809 | A1 | 12/2004 | Ramani et al. |
| 2006/0012597 | A1* | 1/2006 | Chakraborty ....... G06F 16/5854 345/419 |
| 2008/0075328 | A1* | 3/2008 | Sciammarella ........ G01B 11/25 348/222.1 |
| 2008/0109097 | A1 | 5/2008 | Takahashi et al. |
| 2014/0148939 | A1* | 5/2014 | Nakano .............. G01B 11/2513 700/166 |
| 2015/0186457 | A1 | 7/2015 | Enomoto et al. |
| 2016/0059373 | A1 | 3/2016 | Daimaru et al. |
| 2016/0335777 | A1* | 11/2016 | Borsdorf ............... G06T 7/0012 |
| 2017/0337733 | A1 | 11/2017 | Georgescu et al. |
| 2019/0018907 | A1 | 1/2019 | He et al. |

FOREIGN PATENT DOCUMENTS

| | | | | |
|---|---|---|---|---|
| CN | 103988135 | A | | 8/2014 |
| JP | 2001-219341 | A | | 8/2001 |
| JP | 2003-216931 | A | | 7/2003 |
| JP | 2006-520055 | A | | 8/2006 |
| JP | 2006-520948 | A | | 9/2006 |
| JP | 2010-231632 | A | | 10/2010 |
| JP | 2017-208092 | A | | 11/2017 |
| WO | 2006/137120 | A1 | | 12/2006 |
| WO | WO 2010/094022 | A1 | * | 8/2010 ......... G05B 19/4099 |
| WO | 2013/183485 | A1 | | 12/2013 |
| WO | 2014/080733 | A1 | | 5/2014 |
| WO | 2014/156635 | A1 | | 10/2014 |
| WO | 2017/122467 | A1 | | 7/2017 |

OTHER PUBLICATIONS

International Search Report and Written Opinion dated Feb. 25, 2020, received for PCT Application PCT/JP2019/046610, Filed on Nov. 28, 2019, 14 pages including English Translation.

Notification of Reasons for Refusal dated Nov. 4, 2020, received for JP Application 2020-527124, 4 pages including English Translation.

Decision to Grant dated Jan. 5, 2021, received for JP Application 2020-527124, 5 pages including English Translation.

* cited by examiner

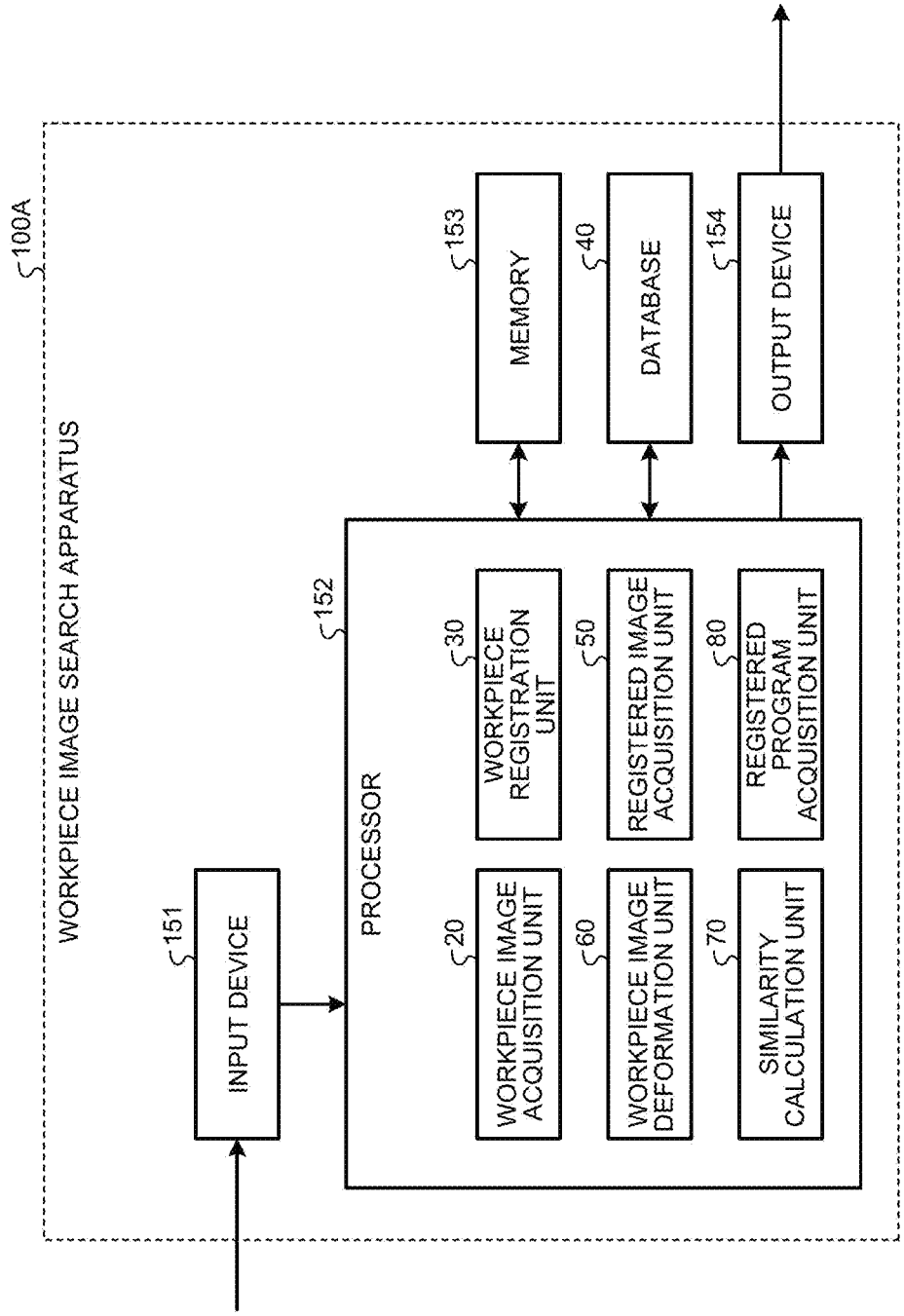

WORKPIECE IMAGE SEARCH APPARATUS AND WORKPIECE IMAGE SEARCH METHOD

CROSS-REFERENCE TO RELATED APPLICATION

The present application is based on PCT filing PCT/JP2019/046610, filed Nov. 28, 2019, the entire contents of which are incorporated herein by reference.

FIELD

The present invention relates to a workpiece image search apparatus that searches for a workpiece image, a workpiece image search method, and a machine learning device.

BACKGROUND

A machine tool controlled by a control device such as a numerical control (NC) device machines workpieces having various shapes. Since it takes a lot of time and effort to create a machining program used by the control device in controlling the machine tool, improvement and reinforcement for a creation support function has been in progress for creation of the machining program. For example, the creation support functions for the machining program include a function of creating the machining program by a user setting a dimension of a machining target on an NC display screen while viewing a drawing, a function of creating the machining program such as an NC program by directly reading computer-aided design (CAD) data, and the like. These creation support functions are based on the premise that the machining program is created from scratch, and since the machining program needs to be created from scratch even when a workpiece having a similar shape is to be machined, the efficiency of creating the machining program has been poor.

The efficiency of creating the machining program is increased by using a machining program corresponding to the workpiece having the similar shape. However, in order to re-use the machining program, it is necessary to determine whether or not a workpiece shape of a workpiece to be newly machined is similar to a workpiece shape of a workpiece that has been machined in the past.

A machining step generation device described in Patent Literature 1 compares a machining shape bitmap obtained by converting a machining shape of CAD data into a bitmap with a machining shape bitmap registered in a database, and thereby extracts a machining shape matching the machining shape given as the CAD data.

CITATION LIST

Patent Literature

Patent Literature 1: International Publication No. WO 2006/137120

SUMMARY

Technical Problem

However, the technique of Patent Literature 1 above merely compares simple pixels between the bitmaps that are two-dimensional images, and the similarity between workpiece images is lowered only with the aspect ratio of workpiece dimensions being changed, whereby it has been difficult to detect a workpiece image other than a workpiece image of a workpiece having a perfect match of the workpiece shape.

The present invention has been made in view of the above circumstances, and an object of the present invention is to provide a workpiece image search apparatus that can easily search for a workpiece image of a workpiece having a workpiece shape similar to that of a workpiece that is a search target.

Solution to Problem

In order to solve the above-mentioned problem and achieve the object, the present invention provides a workpiece image search apparatus comprising: a workpiece image deformation unit to use a first workpiece image and a second workpiece image to generate a third workpiece image by deforming the second workpiece image so that a difference in workpiece shape between the first workpiece image and the second workpiece image is made smaller, the first workpiece image being obtained by projecting a first workpiece shape of a first workpiece on a two-dimensional plane, the second workpiece image being obtained by projecting a second workpiece shape of a second workpiece on a two-dimensional plane; and a similarity calculation unit to calculate a similarity between the first workpiece shape and the second workpiece shape by comparing the third workpiece image with the first workpiece image.

Advantageous Effects of Invention

The workpiece image search apparatus according to the present invention has an advantageous effect that it can easily search for the workpiece image of a workpiece similar in workpiece shape to a workpiece that is a search target.

BRIEF DESCRIPTION OF DRAWINGS

FIG. 18 is a diagram illustrating an example of a hardware configuration by which the workpiece image search apparatuses according to the first and second embodiments are implemented.

DESCRIPTION OF EMBODIMENTS

Hereinafter, a workpiece image search apparatus, a workpiece image search method, and a machine learning device according to embodiments of the present invention will be described in detail with reference to the drawings. Note that the present invention is not necessarily limited by these embodiments.

First Embodiment

Figure 1:
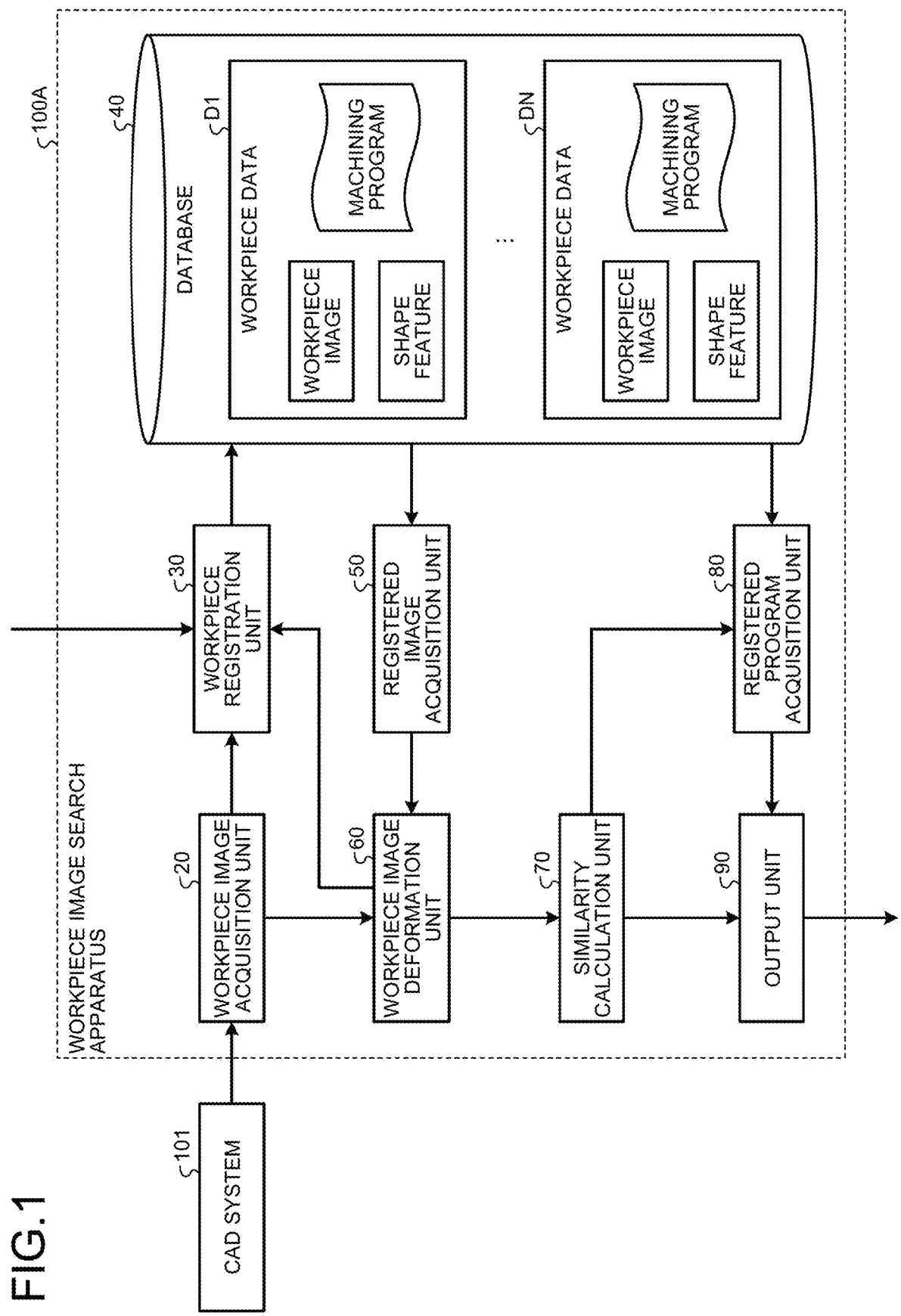
FIG. 1 is a diagram illustrating a configuration of a workpiece image search apparatus according to a first embodiment.

FIG. 1 is a diagram illustrating a configuration of a workpiece image search apparatus according to a first embodiment. A workpiece image search apparatus 100A is a computer that searches for a workpiece image of a workpiece having a workpiece shape similar to that of a workpiece to be machined.

The workpiece image search apparatus 100A is connected to a CAD system 101, and reads three-dimensional data representing the workpiece shape of the workpiece to be machined from the CAD system 101. On the basis of the three-dimensional data that has been read out, the workpiece image search apparatus 100A searches for a workpiece image similar to a workpiece image represented by the three-dimensional data, and outputs the workpiece image obtained by the search and a machining program corresponding to the workpiece image.

The workpiece image search apparatus 100A includes a workpiece image acquisition unit 20, a workpiece registration unit 30, a database 40, a registered image acquisition unit 50, a workpiece image deformation unit 60, a similarity calculation unit 70, a registered program acquisition unit 80, and an output unit 90.

The CAD system 101 creates three-dimensional data representing a workpiece shape by three-dimensional (3D) CAD. The workpiece image acquisition unit 20 reads out the three-dimensional data from the CAD system 101. The workpiece image acquisition unit 20 projects the three-dimensional data onto a two-dimensional plane to thereby convert the three-dimensional data into a workpiece image represented by two-dimensional data. The workpiece image acquisition unit 20 sends the two-dimensional data to the workpiece image deformation unit. 60 and the workpiece registration unit 30.

The database 40 stores workpiece data therein. Description for the present embodiment is directed to a case where the database 40 stores workpiece data sets D1 to DN (N is a natural number). Each of the workpiece data sets D1 to D4 includes a workpiece image, a shape feature that is a feature of a shape of the workpiece image, and a machining program. The database 40 thus stores two or more combinations of the workpiece image and the machining program. The workpiece image is the two-dimensional data generated from the three-dimensional data by the workpiece image acquisition unit 20.

The workpiece image included in the workpiece data sets D1 to DN is an image (two-dimensional data) obtained by division for each viewpoint. The shape feature is a shape feature of a workpiece corresponding to the workpiece image. The shape feature is extracted by the workpiece image deformation unit 60. The machining program is a program used when the workpiece corresponding to the workpiece image is machined.

Note that in the following description, when it is not necessary to distinguish the workpiece data sets D1 to DN from one another, any of the workpiece data sets D1 to DN may be referred to as workpiece data set or sets Dx. The x-th workpiece data set Dx ("x" is any natural number from 1 to N) includes a workpiece image, a shape feature, and a machining program corresponding to an x-th workpiece. Thus, in the workpiece data set Dx, the workpiece image and the machining program for the workpiece are associated with each other.

The registered image acquisition unit 50 is connected to the database 40, and acquires the workpiece image and the shape feature from each of the workpiece data sets D1 to DN registered in the database 40. The registered image acquisition unit 50 sends the acquired workpiece image and shape feature to the workpiece image deformation unit 60. The registered image acquisition unit 50 may acquire the workpiece image and the shape feature in the database 40 by copying them. That is, the registered image acquisition unit 50 may acquire the workpiece image and the shape feature while the workpiece image and the shape feature are left in the database 40.

The workpiece image deformation unit 60 deforms the workpiece shape on the workpiece image acquired by the registered image acquisition unit 50 so that a difference in workpiece shape between the workpiece image created by the workpiece image acquisition unit 20 and the workpiece image acquired by the registered image acquisition unit 50 is made smaller. In the following description, the workpiece image created by the workpiece image acquisition unit 20 may be referred to as a new workpiece image, and the workpiece image acquired by the registered image acquisition unit 50 may be referred to as a registered workpiece image. Moreover, the workpiece image deformed by the workpiece image deformation unit 60 may be referred to as a deformed workpiece image. Furthermore, a workpiece corresponding to the new workpiece image may be referred to as a new workpiece, a workpiece corresponding to the registered workpiece image may be referred to as a registered workpiece, and a workpiece corresponding to the deformed workpiece image may be referred to as a deformed workpiece, case by case.

In a case where the new workpiece image is a first workpiece image, the registered workpiece image is a second workpiece image, and the deformed workpiece image is a third workpiece image. In a case where the registered workpiece image is the first workpiece image, the new workpiece image is the second workpiece image, and the deformed workpiece image is the third workpiece image.

Moreover, in a case where the new workpiece is a first workpiece, the registered workpiece is a second workpiece, and the deformed workpiece is a third workpiece. In a case where the registered workpiece is the first workpiece, the new workpiece is the second workpiece, and the deformed workpiece is the third workpiece.

And then, in a case where the workpiece shape of the new workpiece is a first workpiece shape, the workpiece shape of the registered workpiece is a second workpiece shape, and the workpiece shape of the deformed workpiece is a third workpiece shape. In a case where the workpiece shape of the registered workpiece is the first workpiece shape, the workpiece shape of the new workpiece is the second workpiece shape, and the workpiece shape of the deformed workpiece is the third workpiece shape.

The workpiece image deformation unit 60 extracts the shape feature from the new workpiece image. The workpiece image deformation unit 60 deforms the registered workpiece image on the basis of the shape feature of the registered workpiece image and the shape feature of the new workpiece image, thereby to generate the deformed workpiece image.

The workpiece image deformation unit 60 sends the new workpiece image, the registered workpiece image, and the deformed workpiece image to the similarity calculation unit 70. The workpiece image deformation unit 60 also sends the new workpiece image and the shape feature of the new workpiece image to the workpiece registration unit 30.

The workpiece registration unit 30 is connected to the database 40. The workpiece registration unit 30 is connected to an external device such as a program creating device, and acquires a machining program from the program creating device. The program creating device is a device configured to create the machining program in accordance with an instruction from a user. Meanwhile, the workpiece registration unit 30 acquires the workpiece image and the shape feature from the workpiece image deformation unit 60.

The workpiece registration unit 30 creates new workpiece data by associating a workpiece image (deformed workpiece image) generated by the workpiece image deformation unit 60, the generated machining program corresponding to the workpiece image, and the shape feature corresponding to the generated workpiece image.

The similarity calculation unit 70 calculates a similarity between the workpiece shape of the new workpiece and the workpiece shape of the registered workpiece by comparing the workpiece image of the new workpiece with the workpiece image of the deformed workpiece. The similarity calculation unit 70 determines whether or not the calculated similarity is greater than or equal to a specific value (first specific value), and extracts the registered workpiece image whose similarity is greater than or equal to the specific value, from among all the registered workpiece images.

Note that the similarity calculation unit 70 may calculate a degree of difference between the new workpiece image and the deformed workpiece image. In this case, the similarity calculation unit 70 determines the deformed workpiece image whose degree of difference from the new workpiece image is less than a specific value.

The similarity calculation unit 70 acquires the registered workpiece image having the similarity greater than or equal to the specific value from the workpiece image deformation unit 60, and sends the acquired registered workpiece image, the new workpiece image, and the similarity in association with one another to the output unit 90. Note that the similarity calculation unit 70 may acquire the registered workpiece image having the similarity greater than or equal to the specific value from the database 40.

In addition, the similarity calculation unit 70 sends, to the registered program acquisition unit 80, information (hereinafter referred to as similar image information) used to designate the registered workpiece image having the similarity greater than or equal to the specific value. The similar image information includes information on the similarity corresponding to the registered workpiece image.

The registered program acquisition unit. 80 is connected to the database 40. On the basis of the similar image information sent from the similarity calculation unit 70, the registered program acquisition unit 80 acquires, from the database 40, the registered workpiece image having the similarity greater than or equal to the specific value and the machining program for the registered workpiece image. Note that the registered program acquisition unit 80 may acquire the registered workpiece image from the similarity calculation unit 70. The registered program acquisition unit 80 sends, to the output unit 90, the acquired registered workpiece image and the machining program corresponding to the registered workpiece image in association with each other.

The output unit 90 outputs the registered workpiece image, the new workpiece image, and the similarity associated with one another to an external device such as a display device. The output unit 90 also outputs the registered workpiece image and the machining program associated with each other to an external device such as a display device or a machining program editing device. As a result, the output unit 90 can present, to a user, the new workpiece image corresponding to the workpiece to be machined, the registered workpiece image similar to the new workpiece image, the similarity between the new workpiece image and the registered workpiece image, and the machining program for the registered workpiece image similar to the new workpiece image.

Note that the workpiece image search apparatus 100A may omit output of the machining program for the deformed workpiece image similar to the new workpiece image. In this case, the workpiece image search apparatus 100A need not include the registered program acquisition unit 80.

Moreover, the database 40 may be disposed outside the workpiece image search apparatus 100A. That is, the database 40 may be an external device of the workpiece image search apparatus 100A.

Figure 2:
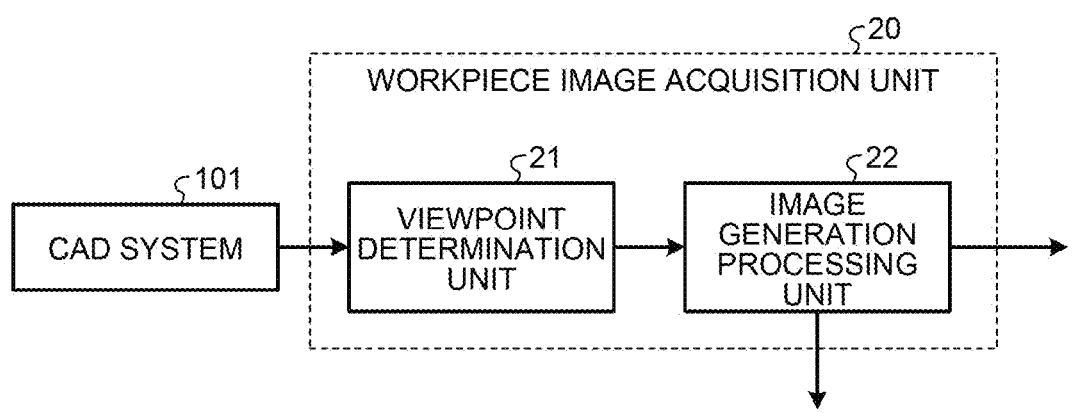
FIG. 2 is a diagram illustrating a configuration of a workpiece image acquisition unit included in the workpiece image search apparatus according to the first embodiment.

FIG. 2 is a diagram illustrating a configuration of the workpiece image acquisition unit included in the workpiece image search apparatus according to the first embodiment. The workpiece image acquisition unit 20 includes a viewpoint determination unit 21 and an image generation processing unit 22.

The viewpoint determination unit 21 determines a line-of-sight direction (viewpoint) of a virtual camera that projects a three-dimensional shape of the new workpiece represented by the three-dimensional data. The viewpoint determination unit 21 determines one or more line-of-sight directions. The viewpoint determination unit 21 sends the determined line-of-sight direction to the image generation processing unit 22. Examples of the line-of-sight direction include a positive direction of an X axis, a positive direction of a Y axis, a positive direction of a Z axis, a negative direction of the X axis, a negative direction of the Y axis, and a negative direction of the Z axis.

The image generation processing unit 22 generates a new workpiece image in the determined line-of-sight direction. The image generation processing unit 22 sends the generated new workpiece image to the workpiece registration unit 30 and the workpiece image deformation unit 60.

Figure 3:
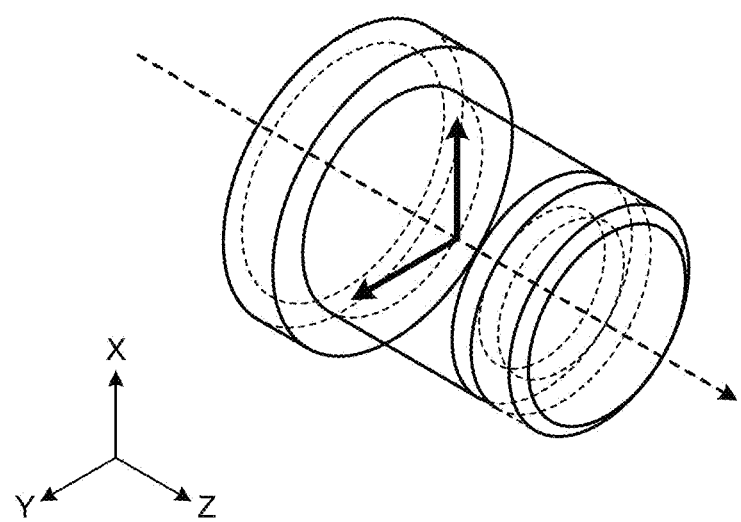
FIG. 3 is a diagram illustrating a configuration of a workpiece represented by three-dimensional data.

FIG. 3 is a diagram illustrating a configuration of a workpiece represented by three-dimensional data. The X axis, Y axis, and Z axis are set for the workpiece. FIG. 3 illustrates a case where a workpiece major axis that is a cylindrical axis is the Z axis, and axes perpendicular to the cylindrical axis are the X axis and the Y axis.

The workpiece illustrated in FIG. 3 is a workpiece obtained after machining, and has a shape in which a part of an outer wall portion of a cylindrical member has been cut out. Specifically, the workpiece is formed of a first cylindrical member having a first diameter, a second cylindrical member having a second diameter, a third cylindrical member having a third diameter, and a fourth cylindrical member having a fourth diameter. Each of the first to fourth cylindrical members has a central axis on the cylindrical axis. The first to fourth cylindrical members of the workpiece are formed by cutting first to fourth regions of a cylindrical member.

Figure 4:
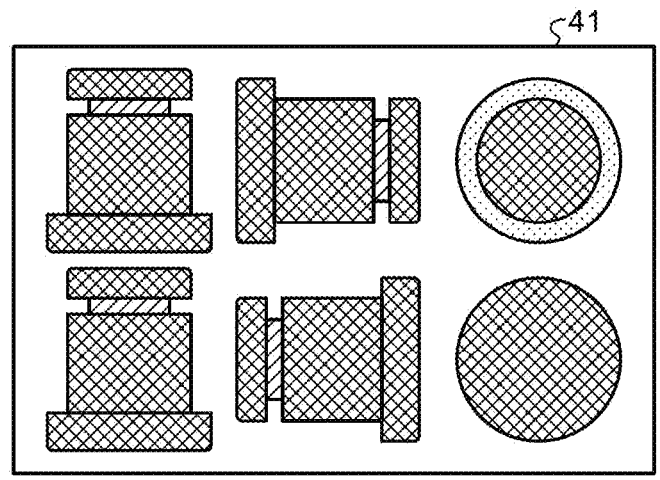
FIG. 4 is a diagram illustrating a configuration of a workpiece represented by two-dimensional data.

FIG. 4 is a diagram illustrating a configuration of a workpiece represented by two-dimensional data. FIG. 4 illustrates two-dimensional data 41 corresponding to the three-dimensional data illustrated in FIG. 3. The two-dimensional data 41 is a workpiece image obtained by the image generation processing unit 22 converting the three-dimensional data into the two-dimensional data.

As illustrated in FIG. 4, images from various viewpoints can be obtained from the three-dimensional data of the workpiece. Note that in FIG. 4 and FIGS. 7 and 10 to be described later, the workpiece images are hatched and each represent an image viewed from a specific viewpoint. FIG. 4 illustrates depth images for six viewpoints in a case where the workpiece is imaged in the positive direction and the negative direction of each of the X axis, the Y axis, and the Z axis in a workpiece coordinate system.

The depth image is an image expressed such that a luminance value changes in accordance with the distance in a depth direction of a subject as viewed from an imaging viewpoint. Note that an image format used by the workpiece image search apparatus 100A is not necessarily limited to the depth image. The workpiece image search apparatus 100A may use a grayscale image. The grayscale image has an advantage that a feature resulting from how the actual workpiece looks can be seen, whereas the depth image has an advantage that a three-dimensional shape can be accurately captured.

Since the image generation processing unit 22 can change the viewpoint of the virtual camera, the unit 22 can obtain workpiece images corresponding to various workpiece shapes by changing the viewpoint so that an invisible portion of the workpiece can be imaged. Moreover, an image projection method applied to the image generation processing unit 22 may be parallel projection instead of perspective projection as in a usual camera image having a sense of perspective. In the case of perspective projection, even a set of straight lines originally having a parallel relationship may not be depicted as parallel lines on an image depending on the camera viewpoint, in some occasions. When an image is subjected to parallel projection, a set of straight lines having a physically parallel relationship is depicted as parallel lines even on an image, so that the parallel projection may be advantageous in determining the workpiece shape in some cases.

Figure 5:
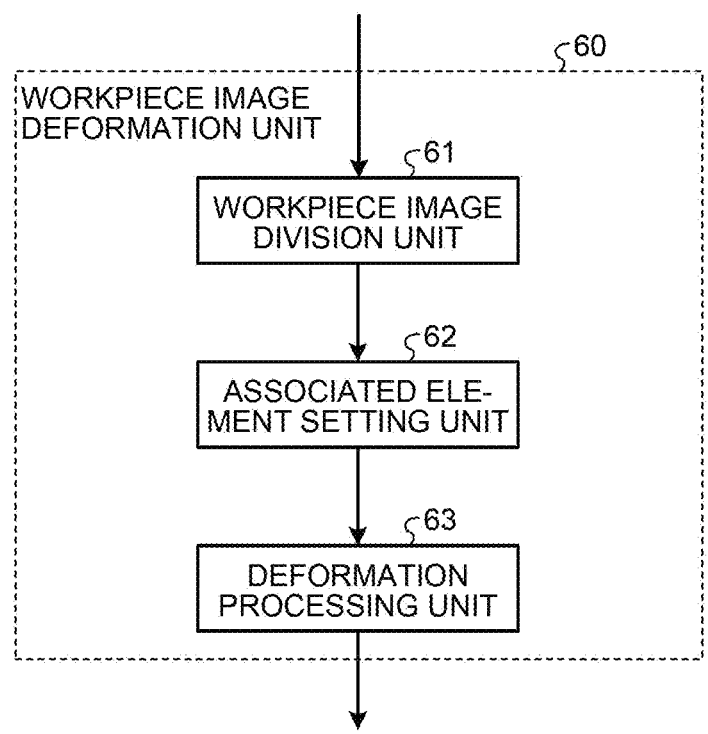
FIG. 5 is a diagram illustrating a configuration of a workpiece image deformation unit included in the workpiece image search apparatus according to the first embodiment.

FIG. 5 is a diagram illustrating a configuration of the workpiece image deformation unit included in the workpiece image search apparatus according to the first embodiment. The workpiece image deformation unit. 60 includes a workpiece image division unit 61, an associated element setting unit 62, and a deformation processing unit 63.

The workpiece image division unit. 61 divides a new workpiece image sent from the image generation processing unit 22 into segments. The workpiece image division unit 61 also receives a registered workpiece image sent from the registered image acquisition unit 50. The registered workpiece image sent from the registered image acquisition unit 50 has been already divided into segments. The workpiece image division unit 61 sends the segments of the new workpiece image and the segments of the registered workpiece image to the associated element setting unit 62.

The associated element setting unit 62 performs association of segments between two workpiece images to be compared. That is, the associated element setting unit 62 sets association between the segments of the new workpiece image and the segments of the registered workpiece image. The associated element setting unit 62 sets the association between the segments of the new workpiece image and the segments of the registered workpiece image on the basis of the line-of-sight direction of the new workpiece image and the line-of-sight direction of the registered workpiece image. That is, the associated element setting unit 62 associates a segment of the new workpiece image and a segment of the registered workpiece image which have the same line-of-sight direction, with each other. The associated element setting unit 62 sends the resultant associated segments to the deformation processing unit 63.

The deformation processing unit 63 deforms the workpiece shape on the workpiece image so that a difference in workpiece shape on the workpiece image is made smaller between the associated segments. Specifically, for the segment of the new workpiece image and the segment of the registered workpiece image having been associated with each other, the deformation processing unit 63 deforms the segment of the registered workpiece image so that the segment of the registered workpiece image approaches to the segment of the new workpiece image. That is, the deformation processing unit 63 deforms the segment of the registered workpiece image having an aspect ratio different from that of the segment of the new workpiece image. The aspect ratio is a ratio of a vertical dimension to a horizontal dimension. For example, the deformation processing unit 63 changes the vertical dimension or the horizontal dimension of the segment of the registered workpiece image so that the aspect ratio of the segment of the registered workpiece image approaches to the aspect ratio of the new workpiece image. Note that the deformation processing unit 63 may change both the vertical dimension and the horizontal dimension of the segment of the registered workpiece image.

The deformation processing unit 63 may deform the segment of the new workpiece image so that the segment of the new workpiece image approaches to the segment of the registered workpiece image. In this case, the deformation processing unit 63 deforms the segment of the new workpiece image having the aspect ratio different from that of the segment of the registered workpiece image. For example, the deformation processing unit 63 changes the vertical dimension or the horizontal dimension of the segment of the new workpiece image so that the aspect ratio of the segment of the new workpiece image approaches to the aspect ratio of the registered workpiece image. Note that the deformation processing unit 63 may change both the vertical dimension and the horizontal dimension of the segment of the new workpiece image.

In the case of deforming the segment of the new workpiece image, the deformation processing unit 63 copies the new workpiece image and then deforms the segment of the copied new workpiece image. In this case, the workpiece image search apparatus 100A stores a new workpiece image from which the copy is made in the database 40 or the like.

The deformation processing unit 63 deforms the workpiece shape on the workpiece image for each associated segment. The deformation processing unit 63 sends the workpiece image whose workpiece shape has been deformed to the similarity calculation unit 70 as a deformed workpiece image.

Figure 6:
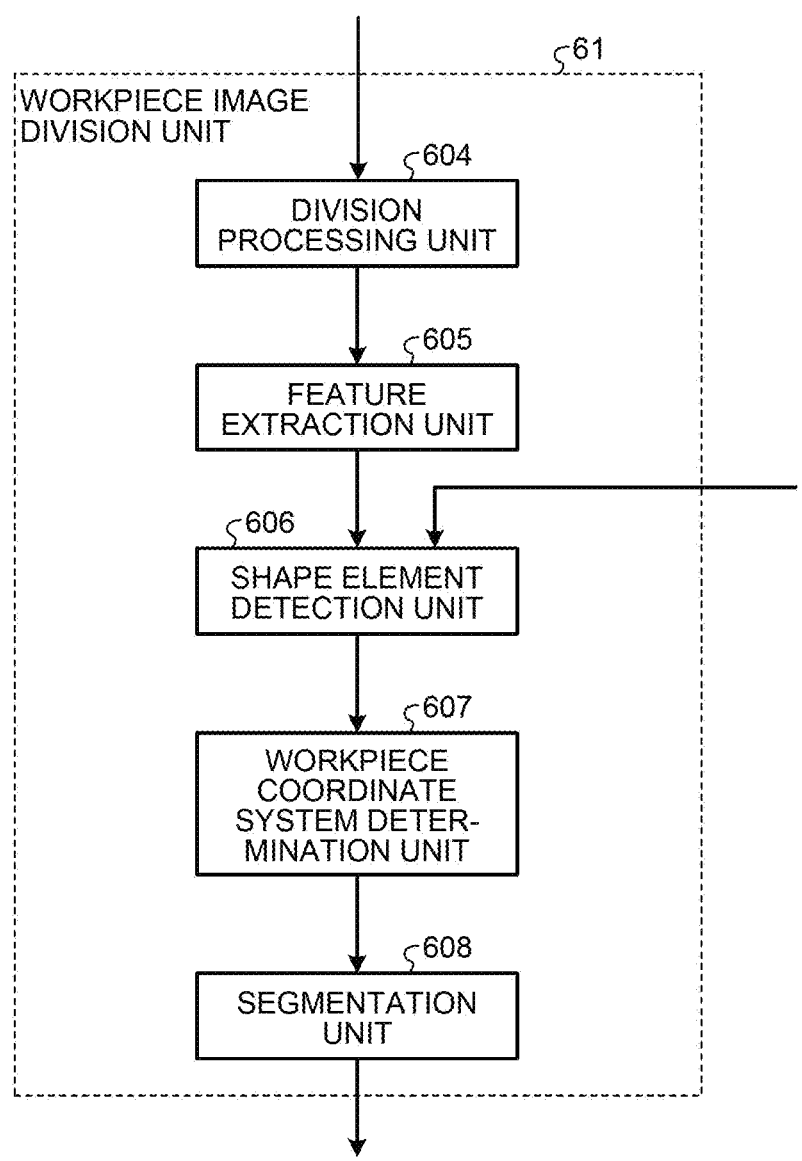
FIG. 6 is a diagram illustrating a configuration of a workpiece image division unit included in the workpiece image deformation unit according to the first embodiment.

FIG. 6 is a diagram illustrating a configuration of the workpiece image division unit included in the workpiece image deformation unit according to the first embodiment. The workpiece image division unit 61 includes a division processing unit 604, a feature extraction unit 605, a shape element detection unit 606, a workpiece coordinate system determination unit 607, and a segmentation unit 608.

Upon receiving the new workpiece image from the workpiece image acquisition unit 20, the workpiece image division unit 61 divides the new workpiece image into segments each corresponding to a viewpoint, and sends the new workpiece image obtained by the division into the segments each corresponding to a viewpoint, to the associated element setting unit 62. Specifically, the division processing unit 604 divides a six-viewpoint image of the new workpiece image into images of six viewpoints. The division processing unit 604 sends the new workpiece images obtained by the division to the feature extraction unit 605.

The feature extraction unit 605 extracts a shape feature that is a visual feature such as an edge, from each new workpiece image obtained by the division for each viewpoint. The feature extraction unit 605 sends the new workpiece image having already been subjected to the division and the shape feature of the new workpiece image to the shape element detection unit 606, the workpiece coordinate system determination unit 607, and the workpiece registration unit 30.

The shape element detection unit 606 detects a shape element such as a rectangle or a circle from the shape feature or features extracted by the feature extraction unit 605. Moreover, when receiving the registered workpiece image and the shape feature for each viewpoint for which the shape feature has been extracted from the registered image acquisition unit 50, the shape element detection unit 606 detects a shape element such as a rectangle or a circle from the received shape feature. The shape element detection unit 606 sends the extracted shape feature and the detected shape element to the workpiece coordinate system determination unit 607. The shape feature and the shape element sent to the workpiece coordinate system determination unit 607 by the shape element detection unit 606 include a shape feature and a shape element of the new workpiece image and a shape feature and a shape element of the registered workpiece image.

On the basis of the detected shape feature, the workpiece coordinate system determination unit 607 determines the coordinate system of the workpiece image such that the workpiece shape and the workpiece coordinate system relationally coincide with each other. That is, on the basis of the line-of-sight direction of the virtual camera, the workpiece coordinate system determination unit 607 associates the line-of-sight direction with the workpiece image in which the shape feature is set. The workpiece coordinate system determination unit 607 sets, for example, the positive direction of the X axis, the positive direction of the Y axis, the positive direction of the Z axis, the negative direction of the X axis, the negative direction of the Y axis, or the negative direction of the Z axis in the workpiece image. The workpiece coordinate system determination unit 607 sets the line-of-sight direction for the new workpiece image and the registered workpiece image. The workpiece coordinate system determination unit 607 sends the new workpiece image and the registered workpiece image for which the line-of-sight direction has been set, to the segmentation unit 608.

The segmentation unit 608 divides the new workpiece image into segments on the basis of the detected shape element. The segmentation unit 608 also divides the registered workpiece image into segments on the basis of the detected shape element. The new workpiece image and registered workpiece image having been subjected to the division into segments by the workpiece image division unit 61 are represented by two-dimensional data.

The workpiece image outputted from the workpiece image division unit 61 includes information on the shape element extracted from the shape feature of the workpiece image, information on the coordinate system (viewpoint) of the workpiece image, and information on the segments included in the workpiece image.

Note that the feature extraction unit 605 may extract the shape feature from the new workpiece image after the workpiece coordinate system determination unit 607 determines the coordinate system of the workpiece image.

Figure 7:
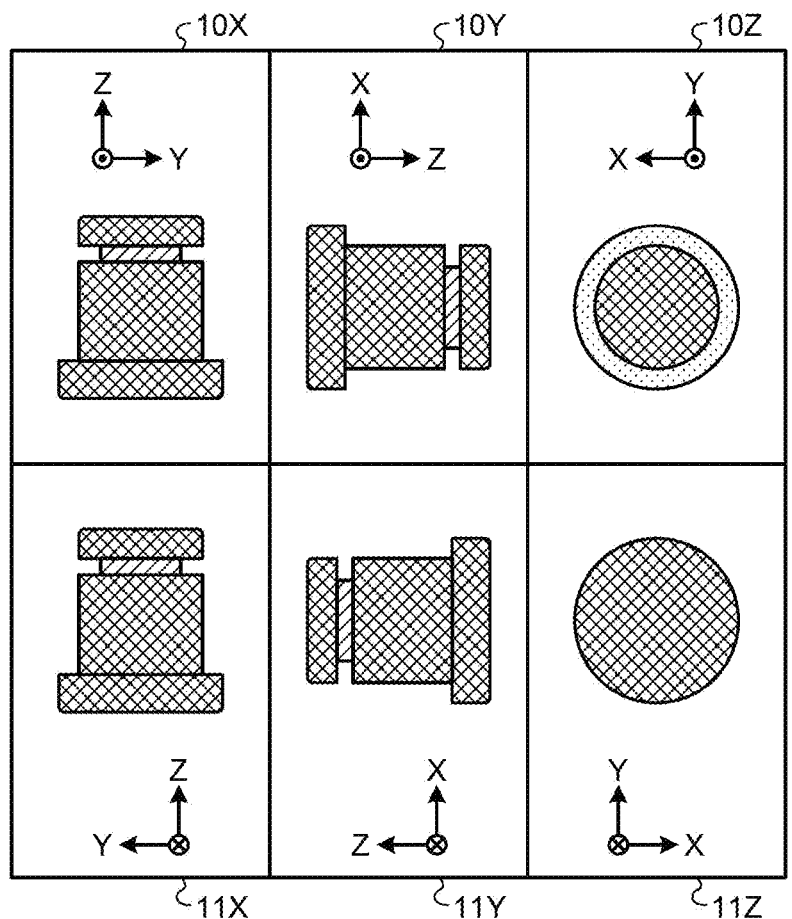
FIG. 7 is a diagram for explaining a coordinate system set in a workpiece image illustrated in FIG. 4.

Here, the line-of-sight direction (coordinate system) set in the workpiece image will be described. FIG. 7 is a diagram for explaining the coordinate system set in the workpiece image illustrated in FIG. 4. Depth images 10X, 10Y, 10Z, 11X, 11Y, and 11Z illustrated in FIG. 7 are new workpiece images or registered workpiece images. An example described here is directed to a case where the depth images 10X, 10Y, 10Z, 11X, 11Y, and 11Z are the new workpiece images.

The depth image 10X is an image of a viewpoint directed from the positive direction to the negative direction of the X axis, and the depth image 11X is an image of a viewpoint directed from the negative direction to the positive direction of the X axis. Therefore, the workpiece coordinate system determination unit 607 sets the line-of-sight direction from the positive direction to the negative direction of the X axis for the depth image 10X, and sets the line-of-sight direction from the negative direction to the positive direction of the X axis for the depth image 11X.

The depth image 10Y is an image of a viewpoint directed from the positive direction to the negative direction of the Y axis, and the depth image 11Y is an image of a viewpoint directed from the negative direction to the positive direction of the Y axis. Therefore, the workpiece coordinate system determination unit 607 sets the line-of-sight direction from the positive direction to the negative direction of the Y axis for the depth image 10Y, and sets the line-of-sight direction from the negative direction to the positive direction of the Y axis for the depth image 11Y.

The depth image 10Z is an image of a viewpoint directed from the positive direction to the negative direction of the Z axis, and the depth image 11Z is an image of a viewpoint directed from the negative direction to the positive direction of the Z axis. Therefore, the workpiece coordinate system determination unit 607 sets the line-of-sight direction from the positive direction to the negative direction of the Z-axis for the depth image 10Z, and sets the line-of-sight direction from the negative direction to the positive direction of the Z-axis for the depth image 11Z.

Figure 8:
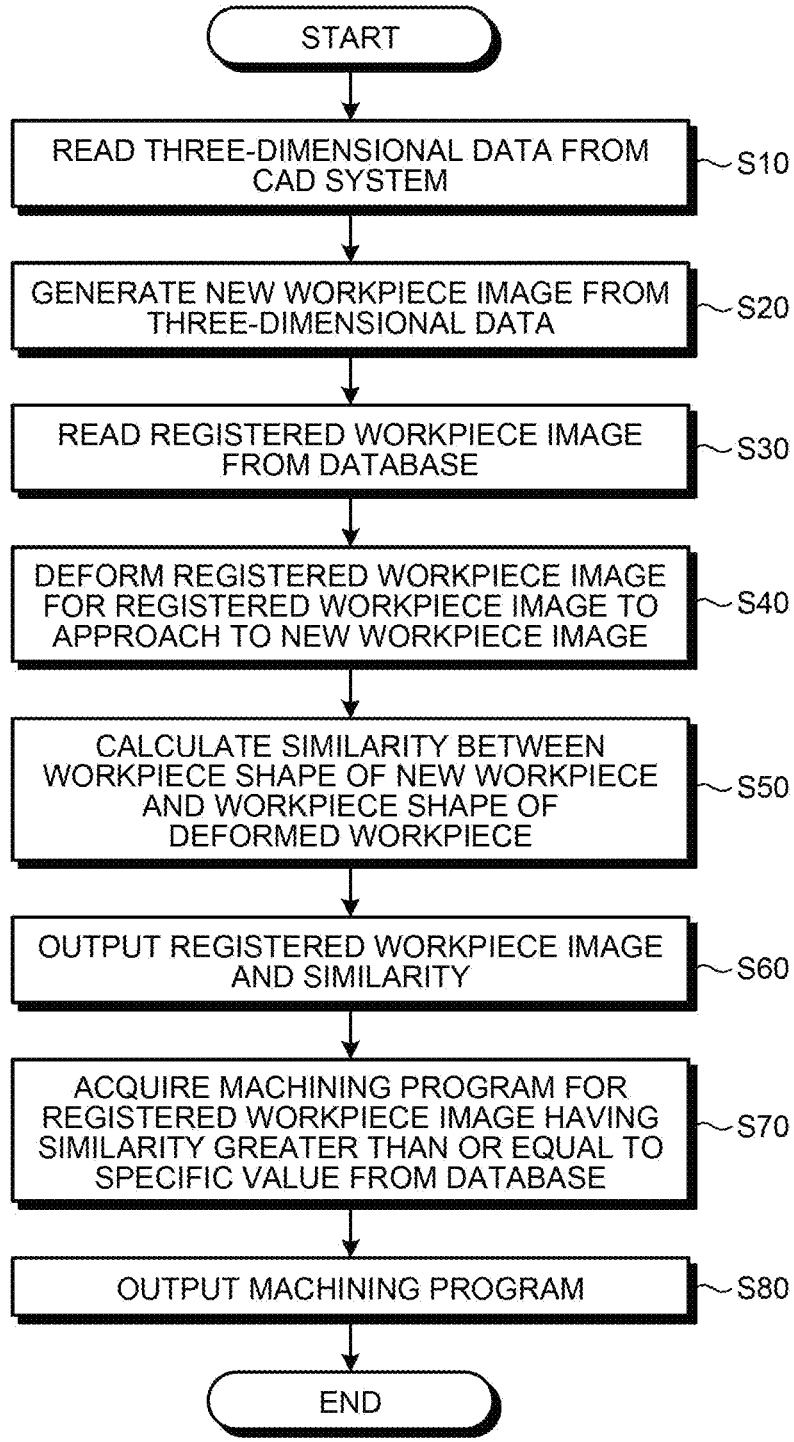
FIG. 8 is a flowchart illustrating a processing procedure of search processing executed by the workpiece image search apparatus according to the first embodiment.

Next, a processing procedure of search processing executed by the workpiece image search apparatus 100A will be described. FIG. 8 is a flowchart illustrating the processing procedure of the search processing executed by the workpiece image search apparatus according to the first embodiment.

The workpiece image acquisition unit 20 reads three-dimensional data out from the CAD system 101 (step S10). The workpiece image acquisition unit 20 generates a new workpiece image represented by two-dimensional data from the three-dimensional data (step S20).

The registered image acquisition unit 50 reads a registered workpiece image out from the database 40 (step S30).

The workpiece image deformation unit 60 deforms the registered workpiece image so that the registered workpiece image approaches to the new workpiece image (step S40). That is, on the basis of the registered workpiece image and the new workpiece image, the workpiece image deformation unit 60 deforms the workpiece shape of the registered workpiece on the registered workpiece image so that the workpiece shape of the registered workpiece approaches to the workpiece shape of the new workpiece. Details of the procedure for the workpiece shape deformation processing performed by the workpiece image deformation unit 60 will be described later.

The similarity calculation unit 70 calculates a similarity between the new workpiece image and the deformed workpiece image. That is, the similarity calculation unit 70 calculates the similarity between the workpiece shape of the new workpiece and the workpiece shape of the deformed workpiece by comparing the deformed workpiece image with the new workpiece image (step S50). Since the deformed workpiece image corresponds to the registered workpiece image, the similarity between the new workpiece image and the deformed workpiece image corresponds to the similarity between the new workpiece image and the registered workpiece image. The similarity calculation unit 70 thus calculates the similarity between the new workpiece image and the deformed workpiece image instead of calculating the similarity between the new workpiece image and the registered workpiece image.

The output unit 90 outputs, to a display device or the like, the registered workpiece image corresponding to the deformed workpiece image exhibiting the similarity greater than or equal to a specific value, and the similarity corresponding to this registered workpiece image (step S60). The output unit 90 may output the registered workpiece image for which the similarity of the deformed workpiece image is higher than a specific rank and the similarity corresponding to this registered workpiece image.

Moreover, in a case where the similarity has been calculated after the workpiece image deformation unit 60 deforms the segment of the new workpiece image, the output unit 90 outputs, to a display device or the like, the new workpiece image corresponding to the deformed workpiece image exhibiting the similarity greater than or equal to the specific value and the similarity corresponding to this new workpiece image. The new workpiece image outputted by the output unit 90 is a new workpiece image from which the copy has been made (the workpiece image acquired from the CAD system 101).

In addition, the registered program acquisition unit 60 acquires, from the database 40, a machining program for the registered workpiece image for which the deformed workpiece image exhibits the similarity greater than or equal to the specific value (step S70). The output unit 90 outputs the machining program to a display device or the like (step S80).

Figure 9:
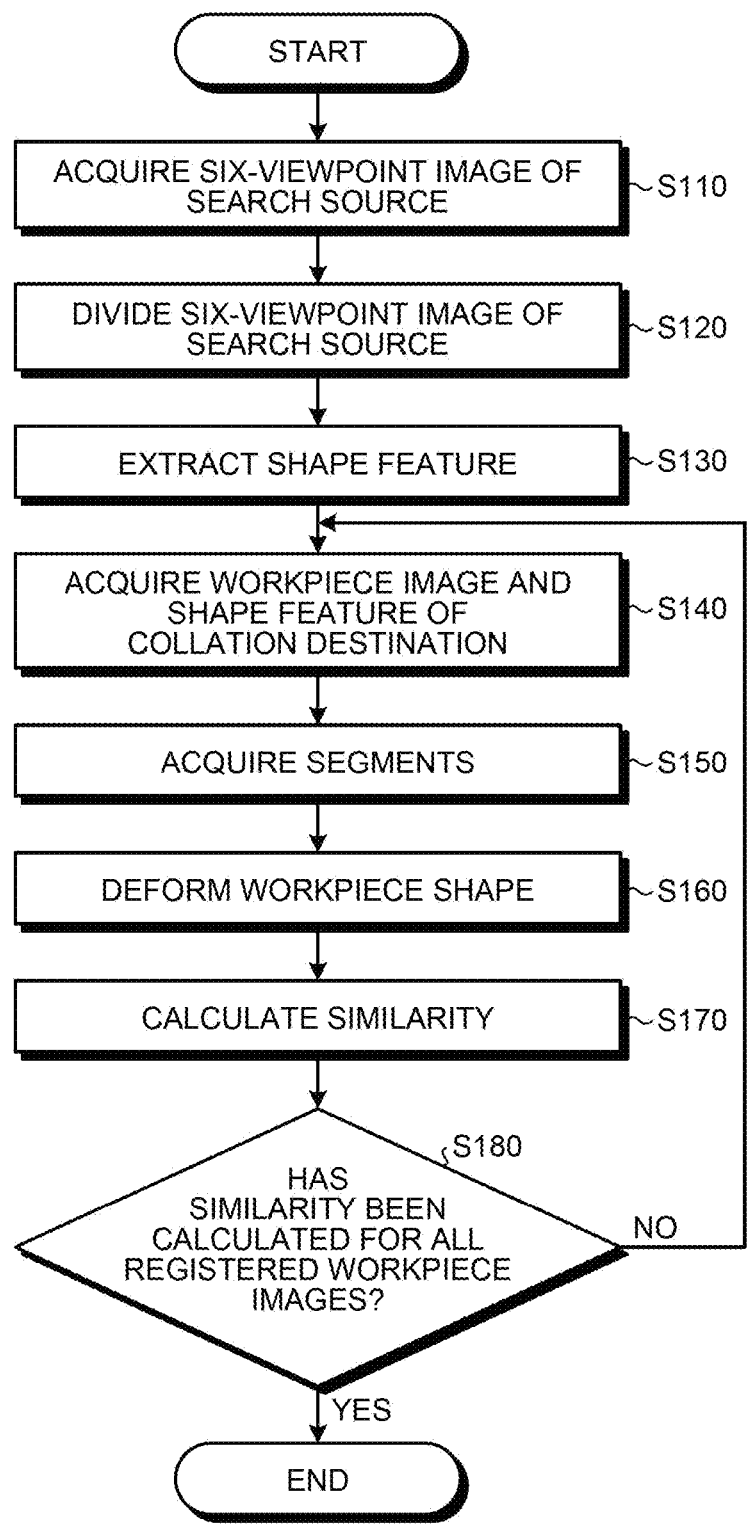
FIG. 9 is a flowchart illustrating a processing procedure of similarity calculation processing executed by the workpiece image search apparatus according to the first embodiment.

Here, a detailed processing procedure of the similarity calculation processing executed by the similarity calculation unit 70 will be described. FIG. 9 is a flowchart illustrating the processing procedure of the similarity calculation processing executed by the workpiece image search apparatus according to the first embodiment.

The workpiece image deformation unit 60 acquires a six-viewpoint image of a search source from the workpiece image acquisition unit 20 (step 110). That is, the workpiece image deformation unit 60 receives a new workpiece image sent from the workpiece image acquisition unit 20.

In the six-viewpoint image, images for six viewpoints are represented as one workpiece image. The division processing unit 604 divides the images for six viewpoints as the search source into images for the viewpoints in order to collate the workpiece images separately (step S120).

The feature extraction unit 605 extracts a shape feature that is a visual feature such as an edge, from the workpiece image for each viewpoint (step S130). The shape feature extracted by the feature extraction unit 605 is registered in the database 40 via the workpiece registration unit 30. The shape element detection unit 606 detects a shape element such as a rectangle or a circle from the shape feature extracted by the feature extraction unit 605.

The workpiece image deformation unit 60 acquires a workpiece image and a shape feature of a collation destination from the database 40 via the registered image acquisition unit 50 (step S140). That is, the workpiece image deformation unit 60 receives, from the registered image acquisition unit 50, the registered workpiece image and the shape feature of the registered workpiece image which have been read out from the database 40 by the registered image acquisition unit 50. The registered workpiece image acquired by the workpiece image deformation unit 60 has been divided for each viewpoint. The shape element detection unit 606 detects the shape element such as a rectangle or a circle from the acquired shape feature.

The workpiece coordinate system determination unit 607 sets a coordinate system used to represent the line-of-sight direction of the new workpiece image on the basis of the shape feature for each viewpoint of the new workpiece image. In addition, the workpiece coordinate system determination unit 607 sets a coordinate system used to represent the line-of-sight direction of the registered workpiece image on the basis of the shape feature for each viewpoint of the registered workpiece image.

The segmentation unit 608 acquires segments by dividing each of the new workpiece image and the registered workpiece image into the segments on the basis of the shape element detected from each of the new workpiece image and the registered workpiece image (step S150).

The associated element setting unit 62 associates the segment of the new workpiece image and the segment of the registered workpiece image both of which have the same line-of-sight direction. That is, the associated element setting unit 62 associates the segments between the new workpiece image that is a search source image and the registered workpiece image that is a collation source image.

The deformation processing unit 63 deforms the workpiece shape on the registered workpiece image (step S160). Specifically, the deformation processing unit 63 deforms the segment of the registered workpiece image so that the shape of the segment of the registered workpiece image approaches to the shape of the segment of the new workpiece image. That is, the deformation processing unit 63 deforms the workpiece shape on the workpiece image for a difference in workpiece shape between the workpiece images to be smaller for each segment having been subjected to the association. The deformation processing unit 63 sends the registered workpiece image of which the segment has been deformed to the similarity calculation unit 70 as a deformed workpiece image. The similarity calculation unit 70 calculates a similarity between the new workpiece image and the deformed workpiece image (step S170). The similarity calculation unit 70 calculates the similarity on the basis of the dimension of the segment of the registered workpiece image and the dimension of the segment of the new workpiece image.

The workpiece image search apparatus 100A determines whether or not the similarity has been calculated for all the registered workpiece images in the database 40 (step S180). That is, the workpiece image search apparatus 100A determines whether or not the similarity has been calculated for all the deformed workpiece images.

If the similarity has not been calculated for all the registered workpiece images in the database 40 (No in step S180), the workpiece image search apparatus 100A executes the processing of steps S140 to S180. The workpiece image search apparatus 100A repeats the processing of steps S140 to S180 until the similarity has been calculated for all the registered workpiece images in the database 40. If the similarity has been calculated for all the registered workpiece images in the database 40 (Yes in step S180), the workpiece image search apparatus 100A ends the similarity calculation processing.

The similarity calculation unit 70 determines the deformed workpiece image having the similarity greater than or equal to a specific value. The registered program acquisition unit 80 acquires, from the database 40, a machining program for the registered workpiece image corresponding to the deformed workpiece image having the similarity greater than or equal to the specific value. A display device displays the registered workpiece image corresponding to the deformed workpiece image having the similarity greater than or equal to the specific value, the similarity of this registered workpiece image with the new workpiece image, and the machining program for this registered workpiece image.

Note that the workpiece image search apparatus 100A does not necessarily need to calculate the similarity for all the registered workpiece images in the database 40. That is, the workpiece image search apparatus 100A need not execute steps S150 to S170 on all the registered workpiece images in the database 40. In other words, on the basis of the shape feature registered in the database 40 and the shape feature of the new workpiece image, the workpiece image search apparatus 100A may set the registered workpiece image having the similarity between the shape features greater than the specific value as a collation target (search target), and exclude the registered workpiece image having the similarity less than the specific value from the collation target. Thus, when the shape feature of the registered workpiece image differs greatly from the shape feature of the new workpiece image, the workpiece image search apparatus 100A may exclude the registered workpiece image having such a great difference from the collation target. In this case, the workpiece image search apparatus 100A only has to execute steps S150 to S170 on the registered workpiece image(s) remaining as the collation target(s).

Figure 10:
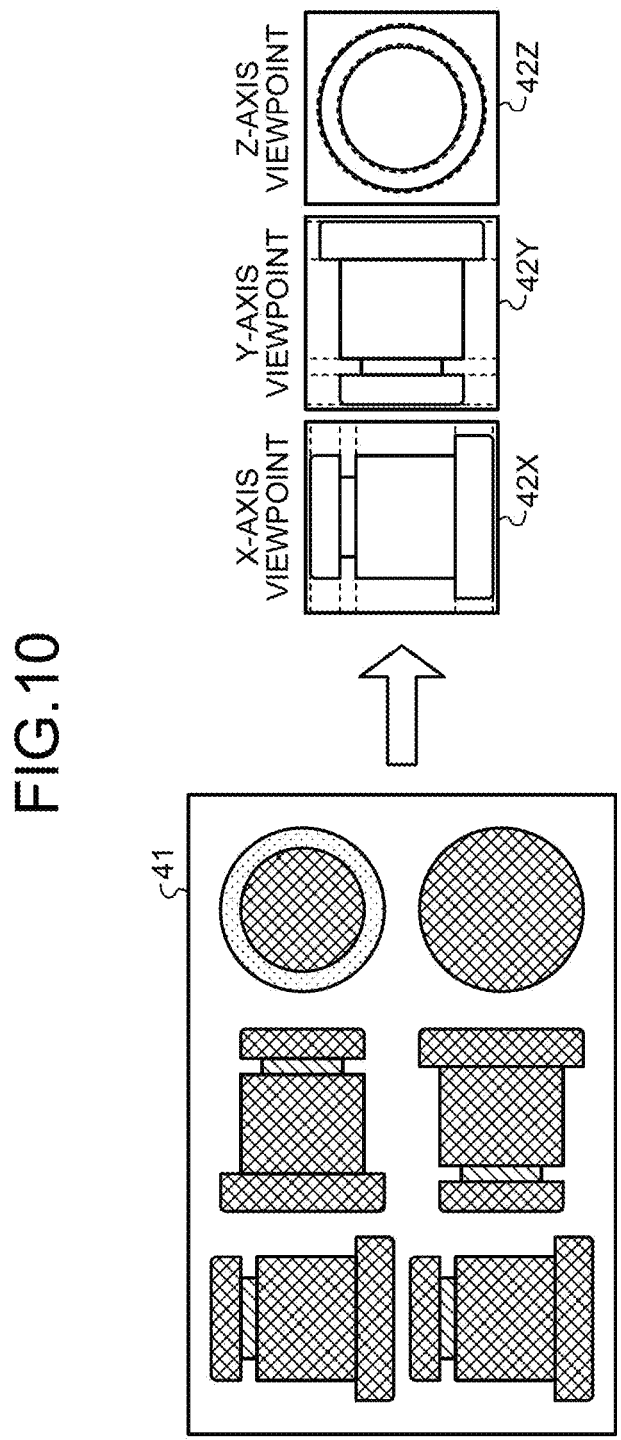
FIG. 10 is a diagram for explaining shape feature extraction processing executed by the workpiece image search apparatus according to the first embodiment.

Here, the shape feature extraction processing described in step S130 will be described. FIG. 10 is a diagram for explaining the shape feature extraction processing executed by the workpiece image search apparatus according to the first embodiment. Description in this part is directed to a case where the feature extraction unit 605 extracts the shape feature from the new workpiece image after the workpiece coordinate system determination unit 607 determines a coordinate system of the workpiece image.

The feature extraction unit 605 extracts, from the two-dimensional data 41 including the workpiece images for various viewpoints, the shape feature such as a straight line or a circle present in the image for each viewpoint. The feature extraction unit 605 extracts the shape feature such as a straight line or a circle from a workpiece image 42X regarding an X-axis viewpoint, a workpiece image 42Y regarding a Y-axis viewpoint, and a workpiece image 42Z regarding a Z-axis viewpoint that are included in the two-dimensional data 41.

In FIG. 10, a straight line or a circle expressed by a dotted line in the workpiece images 42X to 42Z is a shape feature. In a case where the workpiece has a cylindrical shape and the workpiece major axis that is a cylindrical axis of the workpiece is the Z axis, the shape features of the workpiece images 42X and 42Y tend to be expressed as a rectangular parallelepiped represented by a plurality of straight lines.

In the workpiece image 42X, except for the contour line of the workpiece, what characterizes the shape of the workpiece from the X-axis viewpoint is a straight line parallel to the X axis of the workpiece image 42X. In the workpiece image 42Y, except for the contour line of the workpiece, what characterizes the shape of the workpiece from the Y-axis viewpoint is a straight line parallel to the Y axis of the workpiece image 42Y. Moreover, in the workpiece image 42Z, what characterizes the shape of the workpiece is mainly a circle.

Figure 11:
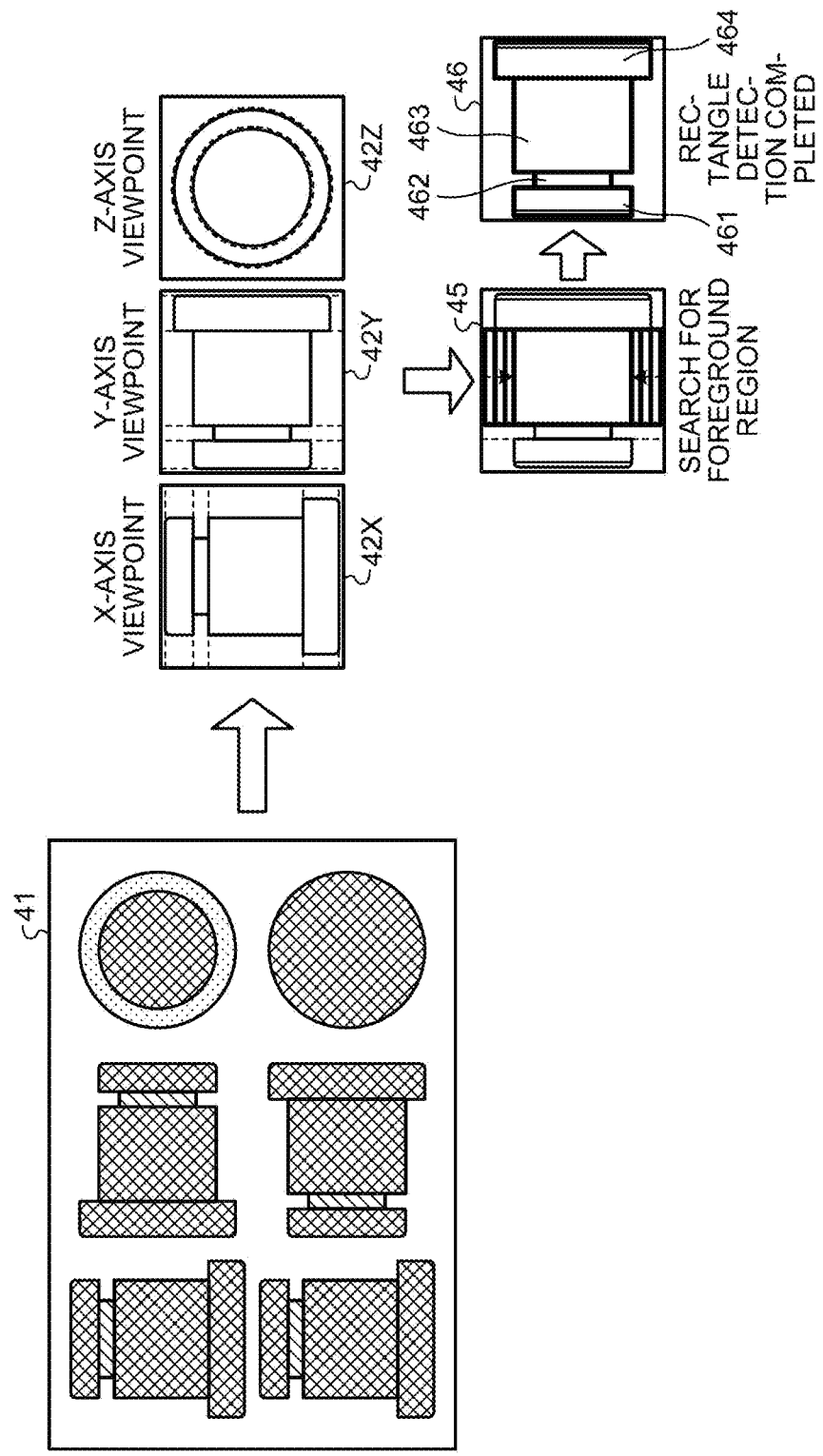
FIG. 11 is a diagram for explaining segmentation processing executed by the workpiece image search apparatus according to the first embodiment.

Next, the segmentation processing described in step S150 will be described. FIG. 11 is a diagram for explaining the segmentation processing executed by the workpiece image search apparatus according to the first embodiment. The segmentation processing in this description is segmentation processing using a straight line, and segmentation processing using a circle will be described later.

As illustrated in the workpiece image 42X, the straight line is a dominant shape feature at the X-axis viewpoint, and as illustrated in the workpiece image 42Y, the straight line is a dominant shape feature at the Y-axis viewpoint. Moreover, the circle is a dominant shape feature at the Z-axis viewpoint. The segmentation unit 608 uses the dominant shape feature at each viewpoint at the time of the segmentation processing.

In FIG. 11, description is given for a case where the segmentation unit 608 executes the segmentation processing on the workpiece image 42Y illustrated in FIG. 10. On the basis of the straight line extracted from the workpiece image 42Y, the segmentation unit 608 performs segmentation on the workpiece assuming that a foreground region of the workpiece is a rectangular region. The foreground region of the workpiece is a region where the workpiece is displayed, of the workpiece image 42Y. In a case where the foreground region of the workpiece is assumed to be a plurality of rectangular regions, each foreground region of the workpiece is a region enclosed by a boundary line between an area where the workpiece is positioned and an area where the workpiece is not positioned, and the straight line that is the shape feature. Therefore, in the case where the foreground region of the workpiece is assumed to be a rectangular region, the segment is also a rectangular region.

The segmentation unit 608 searches the workpiece image 42Y for a boundary line parallel to the Z-axis direction that is a boundary line between the area where the workpiece is positioned and the area where the workpiece is not positioned. At this time, the segmentation unit 608 searches for the boundary line from a side parallel to the Z-axis direction positioned in an upper portion of the workpiece image 42Y toward a position where the workpiece is positioned. The segmentation unit 608 also searches for the boundary line from a side parallel to the Z-axis direction positioned in a lower portion of the workpiece image 42Y toward a position where the workpiece is positioned. The segmentation unit 608 sets, as one segment, a rectangular region enclosed by the boundary line found on the upper side, the boundary line found on the lower side, and two straight lines along the X-axis direction that are the shape feature. The segmentation unit 608 sets one or more segments for the workpiece image 42Y.

Since five straight lines are extracted as the shape feature in the workpiece image 42Y, the workpiece image 42Y includes four rectangular regions. Therefore, the segmentation unit 608 sets four segments for the workpiece image 42Y.

Similarly, the segmentation unit 608 executes the segment processing on the workpiece image 42X. In FIG. 11, the workpiece image being searched for the boundary line is illustrated as a workpiece image 45, and the workpiece image in which segments 461 to 464 are set, that is, the workpiece image in which detection of the rectangular regions has been completed, is illustrated as a workpiece image 46.

Next, the workpiece shape deformation processing described in step S160 will be described. When performing the workpiece shape deformation processing, the deformation processing unit 63 associates the segment of the new workpiece image with the segment of the registered workpiece image. The deformation processing unit 63 executes, on the workpiece image, the workpiece shape deformation processing on the segment of the registered workpiece image associated with the segment of the new workpiece image.

Figure 12:
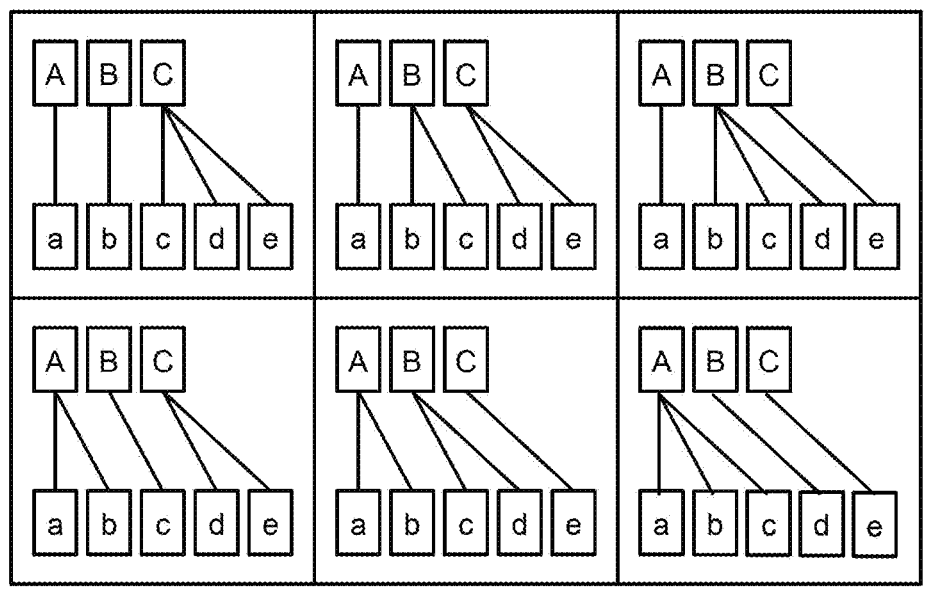
FIG. 12 is a diagram for explaining segment association processing executed by the workpiece image search apparatus according to the first embodiment.

FIG. 12 is a diagram for explaining the segment association processing executed by the workpiece image search apparatus according to the first embodiment. The deformation processing unit 63 associates the segment of the new workpiece image that is an image of a search source workpiece, with the segment of the registered workpiece image that is an image of a collation destination workpiece. In this case, the number of segments of the new workpiece image and the number of segments of the registered workpiece image to be compared by the deformation processing unit 63 may be unequal. In this case, the deformation processing unit 63 performs the association in accordance with the smaller number of segments. The deformation processing unit 63 can uniquely determine the association in a case where the numbers of segments are equal. On the other hand, in a case where the numbers of segments are not equal, there are two or more combinations for the association.

For example, it is assumed that the search source workpiece is constituted by three segments A, B, and C, and the collation destination workpiece is constituted by five segments a, b, c, d, and e. A segment association problem in this case can be solved as a combination problem in which the five segments of the collation destination workpiece are divided into three groups. The deformation processing unit 63 can calculate a combination number Ncomb by using a combination formula nCr. In the formula, n=(the larger number of segments)−1, and r=(the smaller number of segments)−1. Therefore, in the case where the search source workpiece is constituted by the three segments A, B, and C, and the collation destination workpiece is constituted by the five segments a, b, c, d, and e, the combination number Ncomb corresponds to six combinations as illustrated in FIG. 12.

The deformation processing unit 63 determines the similarity of the workpiece images for all combinations possible between the segments, but it is contemplated that as the number of segments increases, the number of combinations increases to lead to a longer processing time. In this case, the deformation processing unit 63 compares a proportion of the foreground region (foreground occupancy) between the segments associated with each other. The foreground occupancy is a proportion of the workpiece image in the region of the segment. For example, in a case where the segment is a rectangular region, the foreground occupancy is a proportion of the workpiece image occupied within the rectangular region. In other words, the foreground occupancy is a ratio of the area of the workpiece image to the area of the rectangular region in the segment. In a case where the workpiece is a cylindrical member, the workpiece may be subjected to chamfering. In this case, the segment has a rectangular shape, whereas the foreground region has a rectangular shape having been chamfered. Therefore, the foreground occupancy may be less than 100% in some cases.

The deformation processing unit 63 may compare the foreground occupancy in the segment of the new workpiece image with the foreground occupancy in the segment of the registered workpiece image, and determine the similarity by selecting a prescribed number of combinations in ascending order of the difference in foreground occupancy. That is, the deformation processing unit 63 may extract a specific number of combinations of segments in ascending order of the difference in foreground occupancy from among the combinations of segments, and determine the similarity for the extracted combinations of segments. In a case where the foreground occupancy of the workpiece differs greatly between the segments, the similarity between the segments is expected to be small, and therefore, even if the segments with the foreground occupancy greatly different therebetween are excluded from the similarity determination processing, the resultant influence on search accuracy is insignificant.

Figure 13:
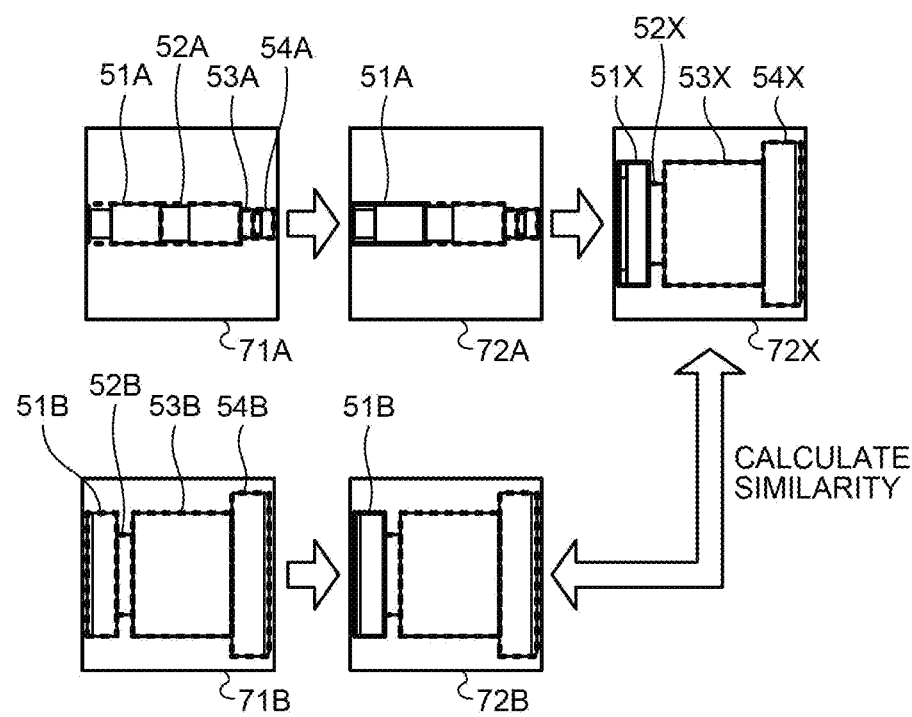
FIG. 13 is a diagram for explaining first deformation processing of segments executed by the workpiece image search apparatus according to the first embodiment.

FIG. 13 is a diagram for explaining first deformation processing of segments executed by the workpiece image search apparatus according to the first embodiment. The workpiece image division unit 61 divides the two-dimensional data 41 of the new workpiece image sent from the image generation processing unit 22 into segments. The workpiece image division unit 61 also receives the registered workpiece image sent from the registered image acquisition unit 50.

FIG. 13 illustrates a case where the registered workpiece image is a workpiece image 71A composed of four segments 51A, 52A, 53A, and 54A, and the new workpiece image is a workpiece image 71B composed of four segments 51B, 52B, 53B, and 54B.

The associated element setting unit 62 performs segment association between the workpiece image 71A and the workpiece image 71B to be compared. The associated element setting unit 62 in this example associates the segment 51A with the segment 51B, and associates the segment 52A with the segment 52B. In addition, the associated element setting unit 62 associates the segment 53A with the segment 53B, and associates the segment 54A with the segment 54B.

The deformation processing unit 63 deforms the workpiece shape on the workpiece image so that the sizes of the associated segments correspond to each other on the basis of the association of the segments. In deforming the workpiece shape, the deformation processing unit 63 adjusts the registered workpiece image that is a workpiece image of the collation destination workpiece to the new workpiece image that is a search source workpiece image. If the association of the segments is known, the deformation processing unit 63 can deform the workpiece shape by simple processing of enlarging or reducing the workpiece shape for each segment.

A workpiece image 72A is an image in a state where the deformation processing unit 63 has selected the segment 51A from the workpiece image 71A, and a workpiece image 72B is an image in a state where the deformation processing unit 63 has selected the segment 51B from the workpiece image 71B.

The deformation processing unit 63 changes the vertical dimension or the horizontal dimension of the rectangular segments 51A to 54A while keeping their rectangular shapes. That is, the deformation processing unit 63 deforms the segment 51A by changing the dimension of the segment 51A so that the shape of the segment 51A fits the shape of the segment 51B. Similarly, the deformation processing unit 63 changes the dimensions of the segments 52A to 54A so that the shape of the segment 52A fits the shape of the segment 52B, the shape of the segment 53A fits the shape of the segment 53B, and the shape of the segment 54A fits the shape of the segment 54B.

A workpiece image 72X is a workpiece image when the segments 51A to 54A are deformed to fit the segments 51B to 54B, respectively. For example, the deformation processing unit 63 makes changes such that the segments 51X to 54X and the segments 51B to 54B have the same shapes by deforming the rectangular segments 51A to 54A into the rectangular segments 51X to 54X, respectively. The workpiece image composed of the segments 51X to 54X is a deformed workpiece image.

The similarity calculation unit 70 calculates a similarity between the workpiece image 72B that is a new workpiece image and the workpiece image 72X that is a deformed workpiece image.

Figure 14:
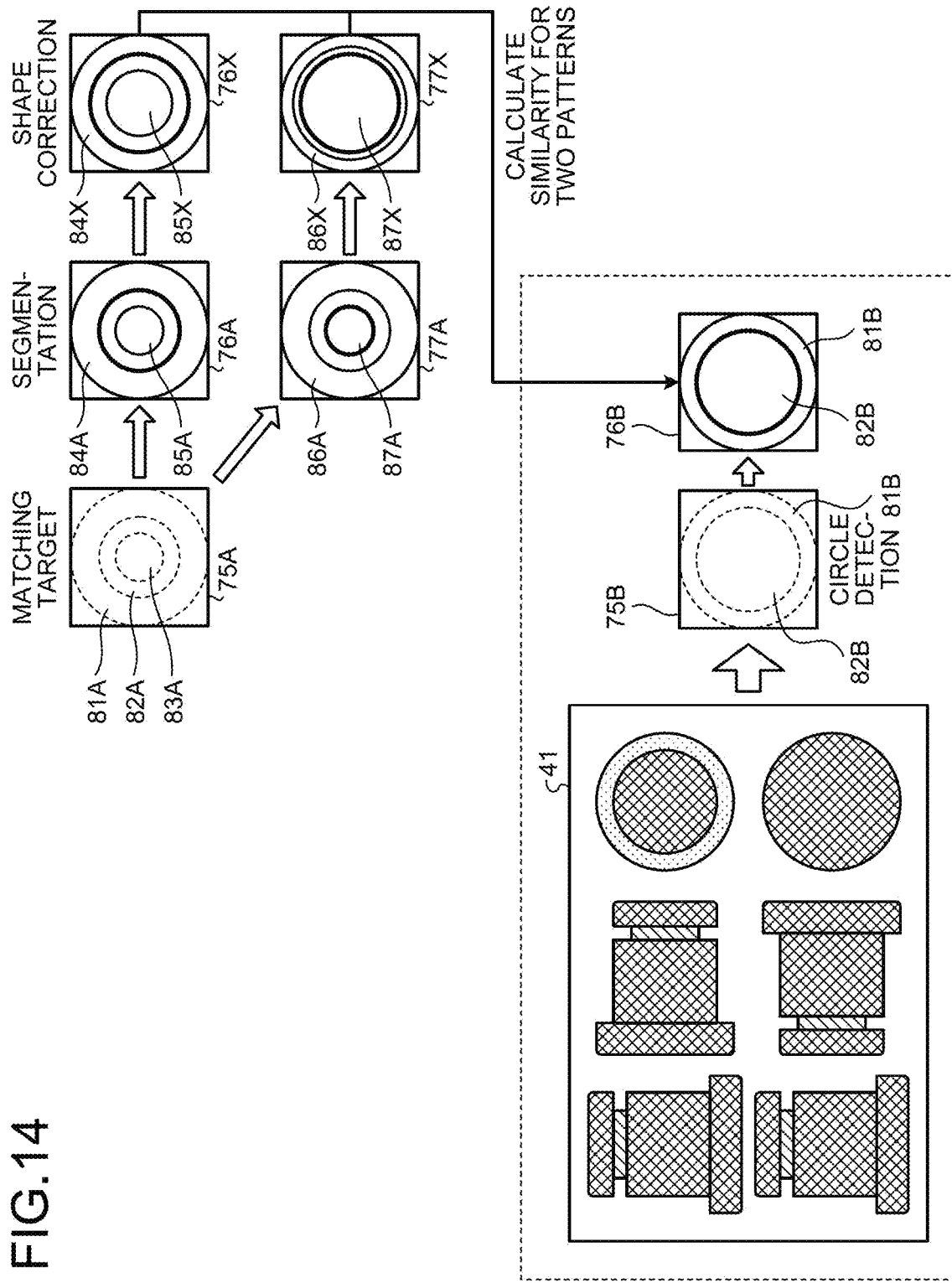
FIG. 14 is a diagram for explaining second deformation processing of segments executed by the workpiece image search apparatus according to the first embodiment.

FIG. 14 is a diagram for explaining second deformation processing of segments executed by the workpiece image search apparatus according to the first embodiment. In FIG. 14, description is given for a case where the shape of the workpiece image from the Z-axis viewpoint is corrected.

The workpiece image division unit 61 divides the two-dimensional data 41 of the new workpiece image sent from the image generation processing unit 22 into segments. The workpiece image division unit 61 also receives the registered workpiece image sent from the registered image acquisition unit 50.

FIG. 14 illustrates a case where the registered workpiece image is a workpiece image 75A composed of three segments 181A, 82A, and 83A, and the new workpiece image is a workpiece image 75B composed of two segments 81B and 82B.

The segment 83A has a circular shape, the segment 82A has an annular shape surrounding the segment 83A, and the segment 81A has another annular shape surrounding the segment 82A. Moreover, the segment 82B has a circular shape, and the segment 81B has an annular shape surrounding the segment 82B.

Since the workpiece image 75B is composed of the two segments 81B and 82B, the workpiece image division unit 61 divides the workpiece image 75B into the two segments 81B and 82B. In FIG. 14, a workpiece image in which the division into the two segments 81B and 82B has been realized is illustrated by a workpiece image 76B.

Since the number of segments of the new workpiece image is different from the number of segments of the registered workpiece image, the workpiece image division unit 61 redoes the segment processing on the registered workpiece image. That is, since the number of segments of the workpiece image 758 is two, the workpiece image division unit 61 divides the workpiece image 75B into two segments.

Since the workpiece image 75A includes the three segments 61A, 82A, and 83A, the workpiece image division unit 61 divides the workpiece image 75A into two patterns. That is, the workpiece image division unit 61 divides the workpiece image 75A into two segments 84A and 85A to generate a workpiece image 76A, and divides the workpiece image 75A into two segments 86A and 87A to generate a workpiece image 77A. The segment 84A has the same shape as the shape of the segment 81A, and the segment 85A has the same shape as a shape obtained by combining the segments 82A and 83A. The segment 86A has the same shape as a shape obtained by combining the segments 81A and 82A, and the segment 87A has the same shape as the shape of the segment 83A.

The associated element setting unit 62 performs segment association between the workpiece image 76A and the workpiece image 76B to be compared. The associated element setting unit 62 in this example associates the segment 81B with the segment 84A, and associates the segment 82B with the segment 85A.

Similarly, the associated element setting unit 62 performs segment association between the workpiece image 77A and the workpiece image 76B to be compared. The associated element setting unit 62 in this example associates the segment 81B with the segment 86A, and associates the segment 82B with the segment 87A.

In performing the segmentation on the workpiece image regarding the Z-axis viewpoint, the deformation processing unit 63 only has to change the segmentation using a straight line to segmentation using a circle.

The deformation processing unit 63 deforms the workpiece shape on the workpiece image so that the size and shape of the associated segments correspond to each other on the basis of the association of the segments. The deformation processing unit 63 deforms the shape of the segment included in the registered workpiece image by processing similar to the processing described with reference to FIG. 13.

The deformation processing unit 63 deforms the shapes of the segments 84A and 85A so that the shape of the segment 84A fits the shape of the segment 81B and the shape of the segment 85A fits the shape of the segment 82B. The deformation processing unit 63 in this example enlarges an inner diameter of the segment 84A radially from the center of the circle, and enlarges a diameter of the segment 85A radially from the center of the circle.

Similarly, the deformation processing unit 63 deforms the shapes of the segments 86A and 87A so that the shape of the segment 86A fits the shape of the segment 81B and the shape of the segment 87A fits the shape of the segment 82B. The deformation processing unit 63 in this example enlarges an inner diameter of the segment 56A radially from the center of the circle, and enlarges a diameter of the segment 87A radially from the center of the circle. Note that as alternative, the deformation processing unit 63 may radially reduce the inner diameter or the diameter of the segment.

A workpiece image 76X is a workpiece image when the segments 84A and 85A are deformed to fit the segments 81B and 82B, respectively. The deformation processing unit. 63 makes changes such that segments 84X and 55X are equal in shape to the segments 81B and 82B by deforming the segments 84A and 85A into the segments 84X and 85X, respectively.

Similarly, a workpiece image 77X is a workpiece image when the segments 86A and 87A are deformed to fit the segments 816 and 82B, respectively. The deformation processing unit 63 makes changes such that segments 86X and 87X are equal in shape to the segments 81B and 82B by deforming the segments 86A and 87A into the segments 86X and 87X, respectively. The workpiece image 76X composed of the segments 84X and 85X is a first deformed workpiece image, and the workpiece image 77X composed of the segments 86X and 87X is a second deformed workpiece image.

The similarity calculation unit 70 compares the segment 82B with the segment 85X and also compares the segment 81B with the segment 84X, thereby to calculate a similarity between the workpiece image 76B that is a new workpiece image and the workpiece image 76X that is a deformed workpiece image.

Moreover, the similarity calculation unit 70 compares the segment 82B with the segment 87X and also compares the segment 81B with the segment 86X, thereby to calculate a similarity between the workpiece image 76B that is a new workpiece image and the workpiece image 77X that is a deformed workpiece image.

Now the similarity calculation processing performed by the similarity calculation unit 70 will be described. Note that description in this part is given for a case where the similarity calculation unit 70 calculates a degree of difference instead of the similarity. The similarity calculation unit 70 calculates a degree of difference $E_{dif}$ by performing normalization such that a value obtained by calculating a difference between corresponding viewpoint images becomes equal to a value of 0 to 1. However, between a workpiece subjected to large shape deformation and a workpiece subjected to small shape deformation in shape correction, even if the difference values are the same, the latter should be evaluated to have higher similarity. For this reason, the similarity calculation unit 70 weights an evaluation value using a shape change rate $\omega^{sc}$ for a scaling ratio in the shape deformation. Specifically, the similarity calculation unit 70 calculates the degree of difference $E_{dif}$ by using the following expression (1). In expression (1), "S" is a normalized difference value, and a subscript "i" indicates an index of each viewpoint.

[Formula 1]

$$E_{dif} = \Sigma_i \omega_i^{sc} S_i \qquad (1)$$

The similarity calculation unit 70 calculates the similarity (degree of difference) for all the workpiece images in the database 40, and presents the calculated similarities to a user via the output unit 90. The similarity calculation unit 70 also presents a machining program for the workpiece image having the similarity greater than a specific value to the user via the output unit 90. At this time, the similarity calculation unit 70 may present, to the user, the machining program whose similarity is the highest for one workpiece, or may present the machining programs in descending order of similarity for a predetermined number of workpieces.

As described above, the workpiece image search apparatus 100A deforms the registered workpiece image having the aspect ratio different from that of the new workpiece image, and then calculates the similarity between the new workpiece image and the registered workpiece image. As a result, the workpiece image search apparatus 100A can calculate the similarity in workpiece shape even between the workpieces whose workpiece shapes do not completely match, thereby being able to determine whether or not the workpiece shapes are similar between the workpieces.

Moreover, the workpiece image search apparatus 100A can adopt any output method in every variation expected from the first embodiment such as presenting side by side a plurality of evaluation results obtained while changing a similarity calculation method to the user.

Although the first embodiment is directed to description for the case where the registered workpiece image having been divided into segments is registered in the database 40, the registered workpiece image before being divided into segments may be registered in the database 40. In this case, when the similarity between the workpiece images is calculated, the division processing unit 604 divides the registered workpiece image into segments.

Also, the registered workpiece image having been divided into segments may be registered in the database 40. In this case, when the similarity between the workpiece images is calculated, the workpiece image division unit 61 need not execute the segmentation processing on the registered workpiece image.

Moreover, the registered workpiece image in which the workpiece coordinate system has been determined may be registered in the database 40. In this case, when the similarity between the workpiece images is calculated, the workpiece image division unit 61 need not determine the workpiece coordinate system for the registered workpiece image.

Moreover, the registered workpiece image from which the shape element has been extracted may be registered in the database 40. In this case, when the similarity between the workpiece images is calculated, the workpiece image division unit 61 need not extract the shape element from the registered workpiece image.

As described above, in the first embodiment, the workpiece image search apparatus 100A generates the deformed workpiece image by deforming the workpiece shape on the registered workpiece image so that the difference in workpiece shape between the new workpiece image and the registered workpiece image becomes smaller. The workpiece image search apparatus 100A calculates the similarity between the new workpiece and the registered workpiece by comparing the deformed workpiece image with the new workpiece image. Then, among the registered workpiece images, the workpiece image search apparatus 100A outputs a workpiece image of the registered workpiece having the similarity greater than or equal to the specific value. As a result, the workpiece image search apparatus 100A can easily search for the workpiece image of the registered workpiece similar to the new workpiece.

In addition, it is possible to easily search for the machining program for the registered workpiece image similar to the new workpiece image. As a result, the user can create a machining program for the new workpiece with use of the machining program obtained by the search, and thus can reduce time and effort to create the machining program for the new workpiece.

Second Embodiment

Next, a second embodiment of the present invention will be described with reference to FIGS. 15 to 17. In the second embodiment, a machine learning device learns whether or not a registered workpiece image should be set as a collation target for a search on the basis of a shape feature of the registered workpiece image registered in the database 40, a shape feature of a new workpiece image, and a similarity between workpiece shapes.

Figure 15:
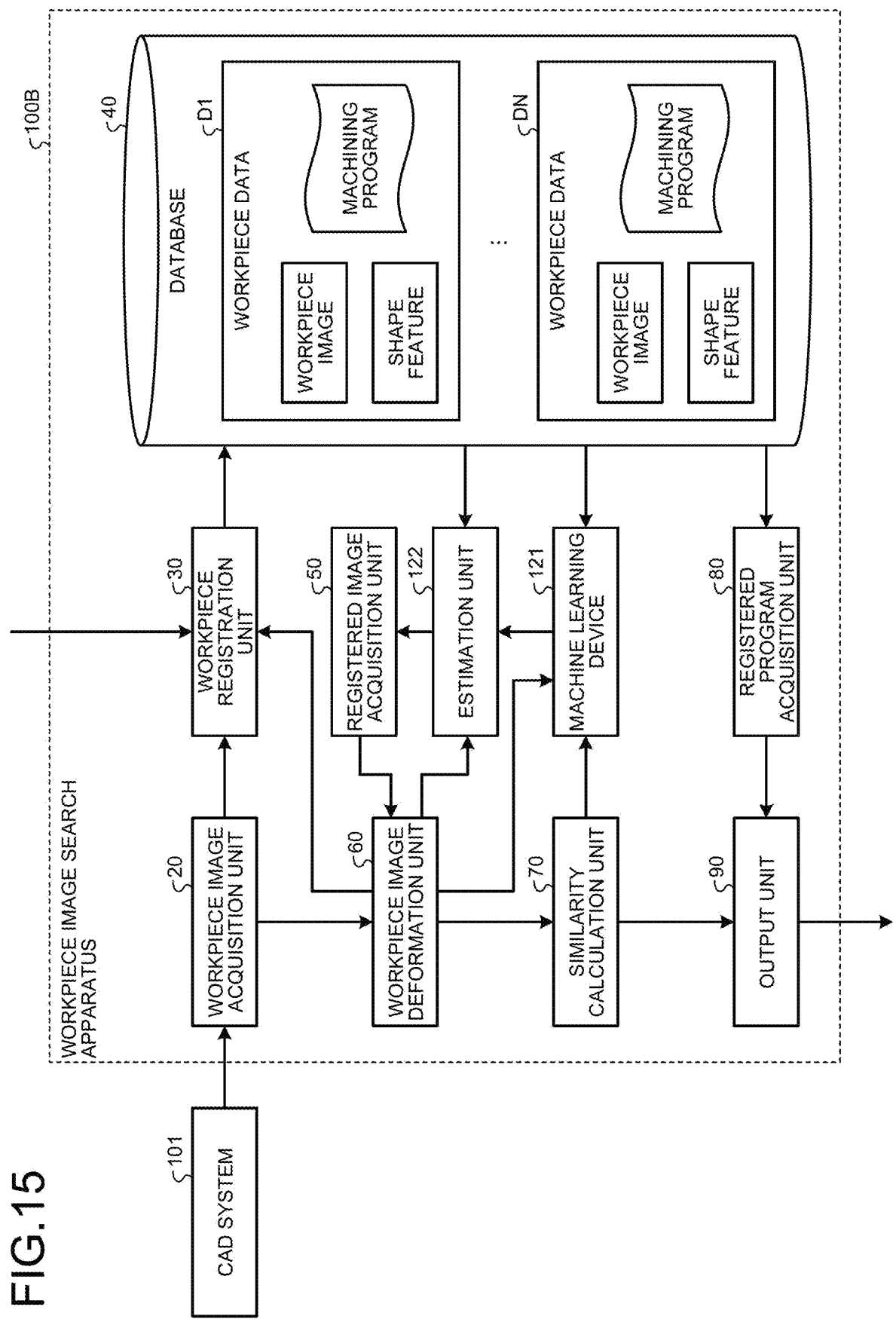
FIG. 15 is a diagram illustrating a configuration of a workpiece image search apparatus according to a second embodiment.

FIG. 15 is a diagram illustrating a configuration of a workpiece image search apparatus according to the second embodiment. Components in FIG. 15 that achieve the same functions as those of the workpiece image search apparatus 100A of the first embodiment illustrated in FIG. 1 are assigned the same reference symbols as those in FIG. 1, and thus redundant description therefor will be omitted.

A workpiece image search apparatus 100B includes a machine learning device 121 and an estimation unit 122 in addition to the components included in the workpiece image search apparatus 100A. The machine learning device 121 is connected to the workpiece image deformation unit 60, the similarity calculation unit 70, and the database 40. The estimation unit 122 is connected to the workpiece image deformation unit 60, the registered image acquisition unit 50, the machine learning device 121, and the database 40.

The machine learning device 121 learns whether or not the registered workpiece image in the database 40 should be set as a target for similarity calculation (collation target) to be used by the similarity calculation unit 70, with use of the shape feature of the new workpiece image, the shape feature of the registered workpiece image, and the similarity. The registered workpiece image to be a collation target is a candidate of a workpiece image similar to the new workpiece image.

When the workpiece image search apparatus 100B has read the new workpiece image, the estimation unit 122 estimates the similarity with respect to the registered workpiece image in the database 40 using the learning result, and determines whether or not the registered workpiece image should be set as the target for similarity calculation of the similarity calculation unit 70 on the basis of the estimation result. That is, the machine learning device 121 learns estimation information obtained by estimating the similarity between the new workpiece image and the registered workpiece image, and determines whether or not the registered workpiece image should be set as the target for similarity calculation on the basis of the estimation information.

The similarity calculated by the similarity calculation unit 70 is assumed to be more accurate than the similarity estimated from the learning result of the machine learning device 121. The machine learning device 121 learns whether or not the registered workpiece image should be set as the collation target according to, for example, a neural network model to be described later. The estimation unit 122 estimates the similarity between the new workpiece image and the registered workpiece image with use of the neural network model learned by the machine learning device 121.

The workpiece image search apparatus 100B of the present embodiment uses the machine learning device 121 and the estimation unit 122 to estimate the similarity between the new workpiece image and the registered workpiece image. On the basis of the estimated similarity, the workpiece image search apparatus 100B sets some of the registered workpiece images in the database 40 as the target for similarity calculation of the similarity calculation unit 70, and excludes the rest of the registered workpiece images from the target for similarity calculation of the similarity calculation unit 70.

Figure 16:
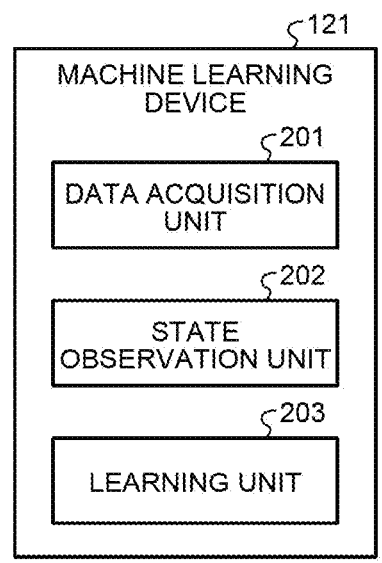
FIG. 16 is a diagram illustrating a configuration of a machine learning device according to the second embodiment.

FIG. 16 is a diagram illustrating a configuration of the machine learning device according to the second embodiment. FIG. 17 is a diagram illustrating a configuration of the neural network used by the machine learning device according to the second embodiment.

The machine learning device 121 includes a data acquisition unit 201, a state observation unit 202, and a learning unit 203. The data acquisition unit 201 acquires the similarity outputted from the similarity calculation unit 70 and sends the similarity to the learning unit 203. The state observation unit 202 observes the shape feature of the new workpiece image and the shape feature of the registered workpiece image as a state variable and sends the state variable to the learning unit 203. The state variable is data in which the shape feature of the new workpiece image and the shape feature of the registered workpiece image are associated with each other.

The learning unit 203 learns whether or not the registered workpiece image should be set as the target for similarity calculation with respect to the new workpiece image on the basis of a data set that is created based on a combination of the shape feature of the new workpiece image, the shape feature of the registered workpiece image, and the similarity.

Note that the machine learning device 121 is not necessarily limited to the case of being disposed in the workpiece image search apparatus 100B, and may be disposed outside the workpiece image search apparatus 100B. In this case, the machine learning device 121 may be, for example, a device that is connected to the workpiece image search apparatus 100B via a network but is separate from the workpiece image search apparatus 100B. Alternatively, the machine learning device 121 may be on a cloud server.

The learning unit 203 performs so-called supervised learning according to the neural network model, for example, and learns whether or not the registered workpiece image should be set as the collation target with respect to the new workpiece image from the state variable and the similarity. Here, the supervised learning refers to a model that gives a large number of sets of data of certain inputs and results (labels) to a learning device, thereby to learn features in those data sets and estimate the result from the input.

A neural network is constituted by an input layer consisting of a plurality of neurons, a middle layer (hidden layer) consisting of a plurality of neurons, and an output layer consisting of a plurality of neurons. As to the middle layer, one middle layer or two or more middle layers may be provided.

Figure 17:
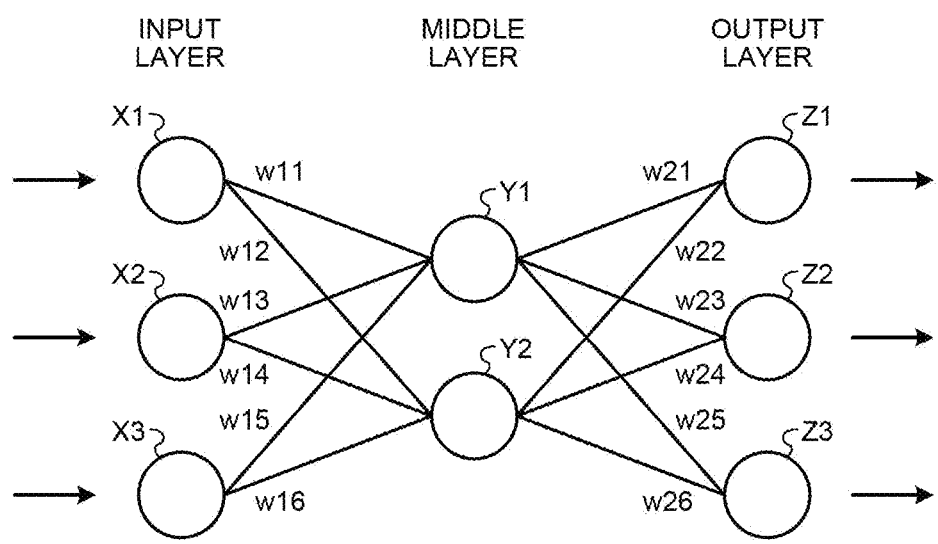
FIG. 17 is a diagram illustrating a configuration of a neural network used by the machine learning device according to the second embodiment.

For example, in the case of a three-layer neural network as illustrated in FIG. 17, when two or more inputs are inputted to input layers X1 to X3, their values are multiplied by weights w11 to w16 and inputted to middle layers Y1 and Y2, and their results are further multiplied by weights w21 to w26 to output the multiplying result from output layers Z1 to Z3. These output results vary depending on the values of the weights w11 to w16 and the weights w21 to w26.

The neural network of the present embodiment learns whether or not the registered workpiece image should be set as the collation target with respect to the new workpiece image by the so-called supervised learning in accordance with the data set created on the basis of the combination of: the shape feature of the new workpiece image and the shape feature of the registered workpiece image observed by the state observation unit 202; and the similarity outputted from the similarity calculation unit 70.

That is, the neural network learns whether or not the registered workpiece image should be set as the collation target with respect to the new workpiece image by adjusting the weights w11 to w16 and w21 to w26 so that the result outputted from the output layer after the shape feature of the new workpiece image and the shape feature of the registered workpiece image are inputted to the input layer approaches to the similarity outputted from the similarity calculation unit 70. The learning unit 203 sends the neural network in which the weights w11 to w16 and w21 to w26 are adjusted to the estimation unit 122.

The neural network can also learn whether or not the registered workpiece image should be set as the collation target with respect to the new workpiece image by so-called unsupervised learning. Unsupervised learning is a method for learning how input data is distributed by giving a large amount of only the input data to the machine learning device 121, and learning by performing compression, classification, shaping, or the like on the input data without providing corresponding teacher data (output data). In the unsupervised learning, features in a data set can be subjected to a process of clustering into similar ones or some other process. The unsupervised learning can predict the output by using the clustering result, setting some criterion, and assigning the output so as to optimize the criterion.

Moreover, the learning unit 203 may learn whether the registered workpiece image should be set as the collation target with respect to the new workpiece image according to data sets created for two or more workpiece image search apparatuses.

Note that the learning unit 203 may learn whether or not the registered workpiece image should be set as the collation target with respect to the new workpiece image while acquiring the data sets from the plurality of workpiece image search apparatuses used in the same site, or while using the data sets collected from the plurality of workpiece image search apparatuses operating independently in their respective different sites. Moreover, the workpiece image search apparatus from which the data set is collected can be added to the object or conversely, can be removed from the target along the way. In addition, the machine learning device that has learned whether the registered workpiece image should be set as the collation target with respect to the new workpiece image for a certain workpiece image search apparatus may be attached to another workpiece image search apparatus, and for this another workpiece image search apparatus, whether the registered workpiece image should be set as the collation target with respect to the new workpiece image may be relearned to make update.

Furthermore, as a learning algorithm used in the learning unit 203, deep learning to learn extraction of a feature quantity itself can be used. The learning unit 203 may also execute machine learning in accordance with another publicly known method such as genetic programming, functional logic programming, or support vector machine, for example.

The estimation unit 122 acquires the neural network in which the machine learning device 121 has adjusted the weights w11 to w16 and w21 to w26, from the machine learning device 121. When searching for the registered workpiece image similar to the new workpiece image, the estimation unit 122 acquires the shape feature of the new workpiece image from the workpiece image deformation unit 60 and acquires the shape feature of the registered workpiece image from the database 40.

When searching for the registered workpiece image similar to the new workpiece image, the estimation unit 122 inputs the shape feature of the new workpiece image and the shape feature of an x-th registered workpiece image to the input layer of the neural network. If the similarity outputted from the output layer is greater than or equal to a specific value (second specific value), the workpiece image search apparatus 100B sets the x-th registered workpiece image as a collation target with respect to the new workpiece image. On the other hand, if the similarity outputted from the output layer is less than the specific value, the workpiece image search apparatus 100B excludes the x-th registered workpiece image from the collation target with respect to the new workpiece image. As a result, the estimation unit 122 extracts the collation target with respect to the new workpiece image from among the workpiece data sets D1 to DN in the database 40. Specifically, the estimation unit 122 extracts the registered workpiece image to be the collation target and the shape feature of this registered workpiece image from among the workpiece data sets D1 to DN in the database 40. The estimation unit 122 sends the extracted registered workpiece image and shape feature to the registered image acquisition unit 50.

The workpiece image search apparatus 100B searches for a workpiece image similar to the new workpiece image from among the registered workpiece images set as the collation target with respect to the new workpiece image. The workpiece image search apparatus 100B searches for the workpiece image similar to the new workpiece image by processing similar to that of the workpiece image search apparatus 100A.

As described above, in the second embodiment, the machine learning device 121 learns the estimation information that is information obtained by estimating the similarity between the new workpiece image and the registered workpiece image. As a result, the workpiece image search apparatus 100B can exclude the registered workpiece image having the low estimated similarity from the target for accurate similarity calculation processing of the similarity calculation unit 70. Therefore, the workpiece image search apparatus 100B can efficiently search for the registered workpiece image of the registered workpiece similar to the new workpiece.

Here, a hardware configuration of the workpiece image search apparatuses 100A and 100B described in the first and second embodiments will be described. FIG. 18 is a diagram illustrating an example of a hardware configuration by which the workpiece image search apparatuses according to the first and second embodiments are implemented. Note that since the workpiece image search apparatuses 100A and 100B have their substantially equal hardware configurations, the hardware configuration of the workpiece image search apparatus 100A will be described in this part.

The workpiece image search apparatus 100A can be implemented by an input device 151, a processor 152, a memory 153, the database 40, and an output device 154 illustrated in FIG. 18. Examples of the processor 152 include a central processing unit (CPU), a central processing device, a processing device, an arithmetic device, a microprocessor, a microcomputer, a processor, or a digital signal processor (DSP), or a system large scale integration (LSI) circuit. The memory 153 is, for example, a random access memory (RAM) or a read only memory (ROM).

The workpiece image search apparatus 100A is implemented by the processor 152 reading and executing a computer-executable workpiece shape search program that is stored in the memory 153 and configured to execute the operation of the workpiece image search apparatus 100A. It can also be said that the workpiece shape search program as a program for executing the operation of the workpiece image search apparatus 110A causes a computer to execute a procedure or a method for the workpiece image search apparatus 100A.

The workpiece shape search program executed by the workpiece image search apparatus 100A has a modular composition including the workpiece image acquisition unit 20, the workpiece registration unit 30, the registered image acquisition unit 50, the workpiece image deformation unit 60, the similarity calculation unit 70, and the registered program acquisition unit 80, which are loaded onto a main storage unit and generated on the main storage unit.

The memory 153 is used as a temporary memory when the processor 152 executes various processings. The memory 153 stores, for example, the workpiece shape search program, the workpiece image 42X from the X-axis viewpoint, the workpiece image 42Y from the Y-axis viewpoint, the workpiece image 42Z from the Z-axis viewpoint, and so on.

The output device 154 outputs the similarity and the like sent from the similarity calculation unit 70 to an external device such as a display device. The output device 154 further outputs the machining program and the like sent from the registered program acquisition unit 80 to an external device such as a display device.

The workpiece shape search program may be provided as a computer program product in a manner that the program is stored in a computer-readable storage medium using a file having an installable format or an executable format. The workpiece shape search program may also be provided to the workpiece image search apparatus 100A via a network such as the Internet.

It should be noted that the functions of the workpiece image search apparatus 100A may be implemented partly by dedicated hardware such as a dedicated circuit and partly by software or firmware.

The configurations illustrated in the above embodiments merely illustrate examples of the content of the present invention, and can each be combined with other publicly known techniques and partially omitted and/or modified without departing from the scope of the present invention.

REFERENCE SIGNS LIST 10X, 10Y, 10Z, 11X, 11Y, 11Z depth image; 20 workpiece image acquisition unit; 21 viewpoint determination unit; 22 image generation processing unit; 30 workpiece registration unit; 40 database; 41 two-dimensional data; 42X to 42Z, 45, 46, 71A, 71B, 72A, 72B, 72X, 75A, 75B, 76A, 76B, 76X, 77A, 77X workpiece image; 50 registered image acquisition unit; 51A to 54A, 51B to 54B, 51X to 54X, 81A to 87A, 81B, 82B, 84X to 87X, 461 to 464 segment; 60 workpiece image deformation unit; 61 workpiece image division unit; 62 associated element setting unit; 63 deformation processing unit; 70 similarity calculation unit; 80 registered program acquisition unit; 90 output unit; 100A, 100B workpiece image search apparatus; 101 CAD system; 121 machine learning device; 122 estimation unit; 151 input device; 152 processor; 153 memory; 154 output device; 201 data acquisition unit; 202 state observation unit; 203 learning unit; 604 division processing unit; 605 feature extraction unit; 606 shape element detection unit; 607 workpiece coordinate system determination unit; 608 segmentation unit; D1 to DN workpiece data set.

The invention claimed is:

1. A workpiece image search apparatus comprising processing circuitry configured as:
   a workpiece image deformation unit to use a first workpiece image and a second workpiece image to generate a third workpiece image by deforming the second workpiece image so that a difference in workpiece shape between the first workpiece image and the second workpiece image is made smaller, the first workpiece image being obtained by projecting a first workpiece shape of a first workpiece on a two-dimensional plane, the second workpiece image being obtained by projecting a second workpiece shape of a second workpiece on a two-dimensional plane; and
   a similarity calculation unit to calculate a similarity between the first workpiece shape and the second workpiece shape by comparing the third workpiece image with the first workpiece image.

2. The workpiece image search apparatus according to claim 1, wherein the processing circuitry is further configured as
   an output unit to output a workpiece image of which a similarity corresponding to the second workpiece shape is greater than or equal to a first specific value in the second workpiece image.

3. The workpiece image search apparatus according to claim 2, further comprising:
   a database to store two or more combinations of the second workpiece image and a machining program used for machining the second workpiece; and
   the processing circuitry is further configured as a registered program acquisition unit to acquire, from the database, a machining program for the workpiece image of which a similarity corresponding to the second workpiece shape is greater than or equal to the first specific value in the second workpiece image, wherein
   the output unit outputs the machining program acquired by the registered program acquisition unit.

4. The workpiece image search apparatus according to claim 1, wherein
   the processing circuitry is further configured as a workpiece image acquisition unit to project three-dimensional data representing the first workpiece shape onto a two-dimensional plane to thereby convert the three-dimensional data into the first workpiece image that is two-dimensional data.

5. The workpiece image search apparatus according to claim 4, wherein
   the workpiece image acquisition unit includes:
   a viewpoint determination unit to determine a viewpoint of a virtual camera that projects the three-dimensional data onto the two-dimensional plane; and
   an image generation processing unit to generate the first workpiece image at the viewpoint determined.

6. The workpiece image search apparatus according to claim 4, wherein
   the three-dimensional data is computer-aided design data.

7. The workpiece image search apparatus according to claim 1, wherein
   the workpiece image deformation unit includes:
   an associated element setting unit to associate a segment included in the first workpiece image with a segment included in the second workpiece image; and
   a deformation processing unit to generate the third workpiece image by deforming the second workpiece image so that a difference in shape between the associated segments is made smaller.

8. The workpiece image search apparatus according to claim 7, wherein
   the deformation processing unit deforms the segment included in the second workpiece image so that a ratio between a vertical dimension and a horizontal dimension of a segment included in the second workpiece image approaches to a ratio between a vertical dimension and a horizontal dimension of a segment included in the first workpiece image.

9. The workpiece image search apparatus according to claim 7, wherein
the workpiece image deformation unit further includes a workpiece image division unit to divide the first workpiece image into segments.

10. The workpiece image search apparatus according to claim 9, wherein
the workpiece image division unit includes:
a feature extraction unit to extract a shape feature that is a feature of a shape from the first workpiece image;
a shape element detection unit to detect a shape element representing a rectangle or a circle from the shape feature extracted; and
a segmentation unit to divide the first workpiece image into segments on the basis of the shape element.

11. The workpiece image search apparatus according to claim 1, wherein
the processing circuitry is further configured as a machine learning device to learn estimation information that is information obtained by estimating a similarity between the first workpiece shape and the second workpiece shape.

12. The workpiece image search apparatus according to claim 11, wherein
the machine learning device includes:
a state observation unit to observe a shape feature of the first workpiece image and a shape feature of the second workpiece image as a state variable;
a data acquisition unit to acquire the similarity; and
a learning unit to learn the estimation information in accordance with a data set created on the basis of a combination of the state variable and the similarity.

13. A workpiece image search method comprising:
a generation step of using a first workpiece image and a second workpiece image to generate a third workpiece image by deforming the second workpiece image so that a difference in workpiece shape between the first workpiece image and the second workpiece image is made smaller, the first workpiece image being obtained by projecting a first workpiece shape on a two-dimensional plane, the second workpiece image being obtained by projecting a second workpiece shape on a two-dimensional plane; and
a calculation step of calculating a similarity between the first workpiece shape and the second workpiece shape by comparing the third workpiece image with the first workpiece image.

* * * * *